(12) United States Patent
Nakagawa et al.

(10) Patent No.: US 10,967,954 B2
(45) Date of Patent: Apr. 6, 2021

(54) ELECTRIC ACTUATOR DRIVING AND CONTROLLING DEVICE, AND AIRCRAFT

(71) Applicant: NABTESCO CORPORATION, Tokyo (JP)

(72) Inventors: Shingo Nakagawa, Gifu-ken (JP); Kazushige Nakajima, Gifu-ken (JP); Takayuki Jinno, Gifu-ken (JP)

(73) Assignee: NABTESCO CORPORATION, Tokyo (JP)

( * ) Notice: Subject to any disclaimer, the term of this patent is extended or adjusted under 35 U.S.C. 154(b) by 590 days.

(21) Appl. No.: 15/654,051

(22) Filed: Jul. 19, 2017

(65) Prior Publication Data
US 2018/0022444 A1 Jan. 25, 2018

(30) Foreign Application Priority Data
Jul. 19, 2016 (JP) .............................. JP2016-141806

(51) Int. Cl.
*B64C 13/50* (2006.01)
*H02P 6/00* (2016.01)
*G05D 1/08* (2006.01)

(52) U.S. Cl.
CPC ............. *B64C 13/50* (2013.01); *H02P 6/00* (2013.01); *G05D 1/0816* (2013.01)

(58) Field of Classification Search
CPC .............................. B64C 13/50; B64C 13/503
See application file for complete search history.

(56) References Cited

U.S. PATENT DOCUMENTS

| | | | |
|---|---|---|---|
| 8,981,704 B2 * | 3/2015 | Endo | B62D 5/046 318/400.01 |
| 9,327,600 B1 | 5/2016 | Nehmen | |
| 2006/0255207 A1 | 11/2006 | Wingett et al. | |
| 2007/0007385 A1 * | 1/2007 | Potter | B64C 13/505 244/53 R |

(Continued)

FOREIGN PATENT DOCUMENTS

| | | |
|---|---|---|
| GB | 2252479 A | 8/1992 |
| JP | 08-216908 A | 8/1996 |

(Continued)

OTHER PUBLICATIONS

Extended European Search Report EP Application No. 17182131.7 dated Dec. 22, 2017.

(Continued)

*Primary Examiner* — Brian M O'Hara
(74) *Attorney, Agent, or Firm* — Pillsbury Winthrop Shaw Pittman, LLP

(57) ABSTRACT

One object is to reduce a volume occupied by a device disposed in a first space spatially limited to a large degree. An electric actuator diving and controlling device is provided with a drive unit positioned in a first space in a piece of equipment and configured to apply power to an electric actuator and a control unit positioned in a second space in the piece of equipment and configured to transmit, to the drive unit, a power command signal including information related to power to be applied to the electric actuator. The first space having the drive unit positioned therein is limited compared with the second space having the control unit positioned therein.

15 Claims, 14 Drawing Sheets

(56) References Cited

U.S. PATENT DOCUMENTS

| | | |
|---|---|---|
| 2007/0145180 A1 | 6/2007 | Johnson et al. |
| 2013/0220726 A1 | 8/2013 | Satou et al. |
| 2015/0060601 A1* | 3/2015 | Nakagawa ............. B64D 41/00 244/99.2 |
| 2016/0072423 A1 | 3/2016 | Kanazawa et al. |

FOREIGN PATENT DOCUMENTS

| | | |
|---|---|---|
| JP | 2007-232346 A | 9/2007 |
| JP | 2008-228548 A | 9/2008 |
| JP | 2010-246309 A | 10/2010 |
| JP | 2012-081828 A | 4/2012 |
| JP | 2015-047934 A | 3/2015 |

OTHER PUBLICATIONS

Notice of Reasons for Refusal dated Jul. 3, 2020 issued in corresponding Japanese Patent Application No. 2016-141806 with English translation.

* cited by examiner

ELECTRIC ACTUATOR DRIVING AND CONTROLLING DEVICE, AND AIRCRAFT

CROSS-REFERENCE TO RELATED APPLICATIONS

This application is based on and claims the benefit of priority from Japanese Patent Application Serial No. 2016-141806 (filed on Jul. 19, 2016), the contents of which are hereby incorporated by reference in their entirety.

TECHNICAL FIELD

The present invention relates to an electric actuator driving and controlling device configured to drive and control an electric actuator installed in a piece of equipment such as a transportation machine. For example, the present invention relates to an electric actuator driving and controlling device configured to drive and control an electric actuator for driving an actuation mechanism configured to drive a moving surface of an aircraft. Furthermore, the present invention relates to an aircraft provided with an electric motor and an electric actuator driving and controlling device.

BACKGROUND

In a transportation machine such as an aircraft, there is used a mechanical component directly or indirectly driven by an electric actuator such as an electric motor. For example, Japanese Patent Application Publication No. 2012-81828 (the '828 Publication) discloses an example in which a hydraulically actuated actuation mechanism configured to drive an elevator of an aircraft is indirectly driven via an electrically operated hydraulic pump. In the '828 Publication, together with a hydraulic pump and an actuator, a driver (an electric motor driving and controlling device) configured to drive and control an electric motor is provided inside a tail plane.

In recent years, it has been requested that a piece of equipment such as an aircraft be further reduced in size. This results in an increased limitation on a space for disposing an electric actuator driving and controlling device therein and increased difficulty in layout designing.

SUMMARY

The present invention has as its object to provide an electric actuator driving and controlling device capable of effectively solving such problems.

The present invention provides an electric actuator driving and controlling device configured to drive and control an electric actuator mounted in a piece of equipment. The electric actuator diving and controlling device is provided with a drive unit positioned in a first space in the piece of equipment and configured to apply power to the electric actuator and a control unit positioned in a second space in the piece of equipment and configured to transmit, to the drive unit, a power command signal including information related to power to be applied to the electric actuator. The first space having the drive unit positioned therein is limited compared with the second space having the control unit positioned therein.

In the electric actuator driving and controlling device according to the present invention, it may also be possible that the drive unit has a drive element portion configured to, based on a voltage or a current inputted, apply power to the electric actuator and an interface portion configured to receive the power command signal and, based thereon, input a voltage or a current to the drive element portion.

In the electric actuator driving and controlling device according to the present invention, it may also be possible that the electric actuator is a polyphase alternating motor or a brushless DC motor, the drive element portion of the drive unit includes a plurality of switching elements corresponding to a plurality of phases of the polyphase alternating motor or the brushless DC motor, respectively, and the interface portion is configured to input a voltage or a current to each of the plurality of switching elements.

In the electric actuator driving and controlling device according to the present invention, it may also be possible that the control unit transmits the power command signal to the drive unit by serial communication.

In the electric actuator driving and controlling device according to the present invention, it may also be possible that the control unit transmits the power command signal to the drive unit by optical communication.

In the electric actuator driving and controlling device according to the present invention, it may also be possible that the interface portion inputs a PWM signal to the drive element portion.

In the electric actuator driving and controlling device according to the present invention, it may also be possible that a period of the serial communication between the control unit and the drive unit is different from a period of the PWM signal inputted to the drive element portion by the interface portion.

In the electric actuator driving and controlling device according to the present invention, it may also be possible that the control unit transmits, as the power command signal, the PWM signal to the drive unit by optical communication.

In the electric actuator driving and controlling device according to the present invention, it may also be possible that the drive unit has a driving power source portion including a power source shutoff switch and connected to the drive element portion, and the interface portion, upon detecting a communication error between itself and the control unit, controls the power source shutoff switch to shut off power supply from the driving power source portion to the drive element portion.

In the electric actuator driving and controlling device according to the present invention, it may also be possible that the control unit, upon detecting a communication error between itself and the drive unit, shuts off a power source connected to the drive unit.

In the electric actuator driving and controlling device according to the present invention, it may also be possible that the drive unit further has a monitor portion configured to obtain monitor information including at least information related to a current value of the electric actuator, and the interface portion transmits the monitor information to the control unit.

In the electric actuator driving and controlling device according to the present invention, it may also be possible that the electric actuator driving and controlling device is provided with a plurality of the drive units, and the control unit has a communication portion configured to transmit the power command signal to each of the plurality of the drive units.

In the electric actuator driving and controlling device according to the present invention, it may also be possible that the control unit receives a speed command signal related to a target speed of the electric actuator, generates the power command signal based thereon, and transmits the power command signal to the drive unit.

In the electric actuator driving and controlling device according to the present invention, it may also be possible that the control unit receives a command signal related to a target operation state of the piece of equipment, generates the power command signal based thereon, and transmits the power command signal to the drive unit.

In the electric actuator driving and controlling device according to the present invention, it may also be possible that the first space has a height lower than a height of the second space.

In the electric actuator driving and controlling device according to the present invention, it may also be possible that the first space is a space in a wing portion of an aircraft, and the second space is a space in a fuselage of the aircraft.

In the electric actuator driving and controlling device according to the present invention, it may also be possible that the first space is a space in a wheel or a brake device of an automobile, and the second space is a space inside a vehicle of the automobile.

In the electric actuator driving and controlling device according to the present invention, it may also be possible that the first space is a space in a vicinity of an intake/exhaust port of an engine of a ship, and the second space is a space in a vicinity of the engine or in an engine control room of the ship.

In the electric actuator driving and controlling device according to the present invention, it may also be possible that the first space is a space in a brake device of a railway vehicle, and the second space is a space in a device box provided under a floor of the railway vehicle.

The present invention provides an aircraft provided with a moving surface, an actuation mechanism configured to drive the moving surface, an electric motor configured to directly or indirectly drive the actuation mechanism, a drive unit positioned inside a wing portion of the aircraft and configured to apply power to the electric motor, and a control unit positioned in a fuselage of the aircraft and configured to transmit, to the drive unit, a power command signal including information related to power to be applied to the electric motor.

ADVANTAGES

According to the present invention, it is possible to reduce a volume occupied by a device disposed in a space spatially limited to a large degree.

DESCRIPTION OF THE PREFERRED EMBODIMENTS

Figure 1:
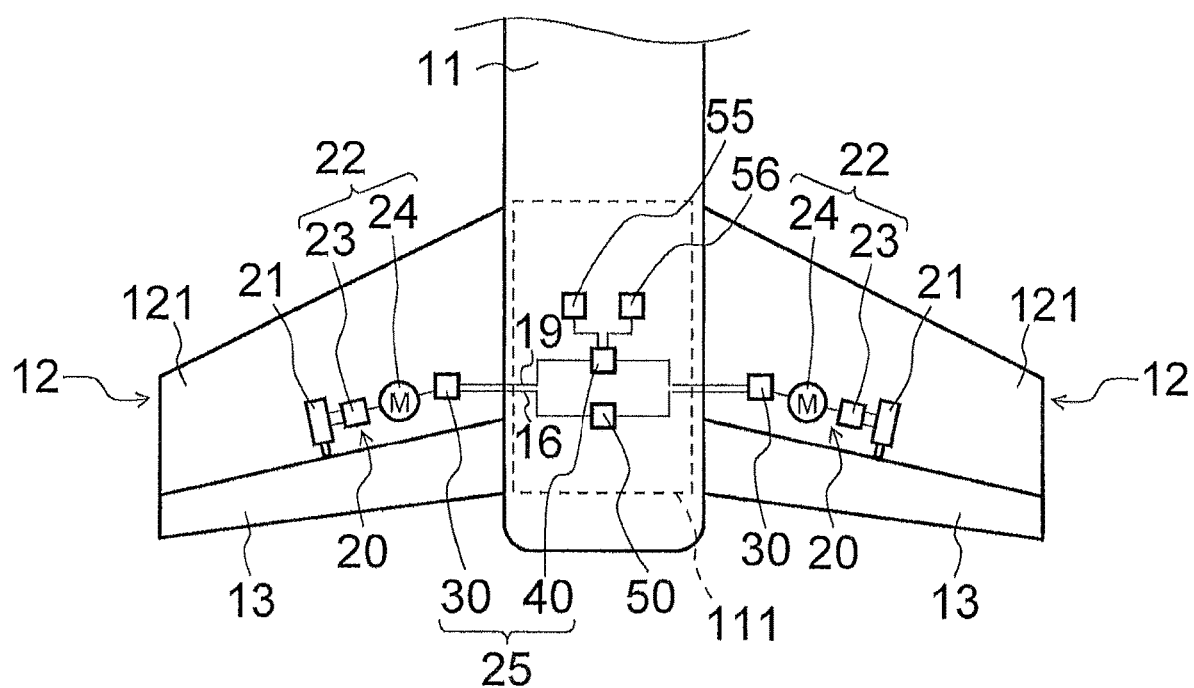
FIG. 1 is a schematic view showing a part of an aircraft provided with an electric actuator driving and controlling device according to one embodiment.

With reference to the appended drawings, the following describes in detail an electric actuator driving and controlling device according to each of embodiments of the present invention. The embodiments described below are each one example of an embodiment of the present invention, and the present invention is not intended to be construed as being limited thereto. Furthermore, in the drawings referred to in the embodiments of the present invention, the same parts or parts having similar functions are denoted by the same or like reference characters, and duplicate descriptions thereof are possibly omitted. Furthermore, for the sake of convenience of description, a dimensional ratio of the drawings is possibly different from an actual dimensional ratio, and some components of a configuration are possibly omitted from the drawings.

In this embodiment, a description is given of an example in which an electric actuator driving and controlling device drives and controls an electric actuator for driving an elevator that is one of moving surfaces of an aircraft.

Aircraft

FIG. 1 is a schematic view showing a rear portion of an aircraft 10 provided with an electric actuator driving and controlling device 25 according to this embodiment. The aircraft 10 may be provided with a fuselage 11 and a wing portion 12. The wing portion 12 may include a pair of horizontal tail planes 121 positioned in the rear portion of the aircraft 10. In FIG. 1, a depiction of a vertical tail plane is omitted.

The pair of horizontal tail planes 121 may be each provided with an elevator 13 as a moving surface constituting a control surface of the aircraft 10. The elevator 13 may be driven by an elevator drive system 20. The elevator drive system 20 may have an actuation mechanism 21, an actuation mechanism drive device 22, the electric actuator driving and controlling device 25, a driving power source device 50, a controlling power source device 55, and an upper-order control device 56.

The actuation mechanism 21 may be disposed in each of the horizontal tail planes 121 and configured to drive the elevator 13. In an example shown in FIG. 1, the actuation mechanism 21 may be a hydraulic actuation mechanism.

The actuation mechanism drive device 22 may include a hydraulic pump 23 and an electric actuator 24 that are disposed in each of the horizontal tail planes 121. The hydraulic pump 23 may supply pressure oil to the actuation mechanism 21 so as to actuate the actuation mechanism 21. In this embodiment, the electric actuator 24 may be a rotary motor 24 configured to rotate by being supplied with power. The rotary motor 24 may be coupled via a coupling or directly coupled without using the coupling to the hydraulic pump 23 and thus can drive the hydraulic pump 23. The rotary motor 24 may be, for example, a polyphase alternating motor or a brushless DC motor. Herein, a description is given of an example in which the rotary motor 24 is a three-phase alternating motor.

Though not shown, it may also be possible that the actuation mechanism 21 is an electrically operated actuation mechanism. In this case, it may also be possible that the rotary motor 24 of the actuation mechanism drive device 22 directly drives the actuation mechanism 21.

Based on a command signal from the upper-order control device 56, the electric actuator driving and controlling device 25 may drive the rotary motor 24 and control a state of the rotary motor 24. The electric actuator driving and controlling device 25 according to this embodiment may be applicable both to a case where the actuation mechanism 21 is of a hydraulic type and a case where the actuation mechanism 21 is of an electrically operated type. That is, the electric actuator driving and controlling device 25 can drive and control the rotary motor 24 configured to indirectly drive the actuation mechanism 21 when configured to be of the hydraulic type via the hydraulic pump 23. Furthermore, the electric actuator driving and controlling device 25 can also drive and control the rotary motor 24 configured to directly drive the actuation mechanism 21 when configured to be of the electrically operated type.

The driving power source device 50 may be a power source configured to supply power having a high voltage of, for example, 270 volts used for driving the rotary motor 24 or the like. As will be described later, the driving power source device 50 may supply power to the drive unit 30 of the electric actuator driving and controlling device 25 via a driving power source line 16. The driving power source device 50 may be disposed in, for example, an electrical bay 111 of the fuselage 11.

The controlling power source device 55 may be a power source configured to supply power of, for example, 28V to be used in a controlling device. As will be described later, the controlling power source device 55 may supply power to a control unit 40 of the electric actuator driving and controlling device 25. The controlling power source device 55 may be disposed in, for example, the electrical bay 111 of the fuselage 11.

The upper-order control device 56 may be formed of, for example, a flight control computer (FC). Based on a target angle of a control surface of the elevator 13, the upper-order control device 56 may calculate a target operation state of the actuation mechanism 21, for example, a target position of a cylinder of the actuation mechanism 21. Furthermore, based on a target position of the actuation mechanism 21, the upper-order control device 56 may calculate a target speed of the rotary motor 24 and input a speed command signal related to the target speed of the rotary motor 24 to the electric actuator driving and controlling device 25. The upper-order control device 56 may be disposed in, for example, the electrical bay 111 of the fuselage 11.

Electric Actuator Driving and Controlling Device

The following describes a configuration of the electric actuator driving and controlling device 25. The electric actuator driving and controlling device 25 may be provided with the drive unit 30 and the control unit 40. As shown in FIG. 1, the drive unit 30 may be disposed inside each of the horizontal tail planes 121. The control unit 40, on the other hand, may be disposed inside the fuselage 11 and, similarly to, for example, the upper-order control device 56, disposed in the electrical bay 111. As thus described, in this embodiment, the electric actuator driving and controlling device 25 may be structurally divided into the drive unit 30 and the control unit 40, with the drive unit 30 disposed in each of the horizontal tail planes 121 and the control unit 40 disposed in the electrical bay 111. Thus, compared with a case where the drive unit 30 and the control unit 40 are both disposed in the horizontal tail planes 121, size and weight reduction of the horizontal tail planes 121 can be achieved.

Based on a command signal from the upper-order control device 56, the control unit 40 may control the drive unit 30 for driving the rotary motor 24. For example, the control unit 40 may transmit a power command signal including information related to power to be applied to the rotary motor 24 to the drive unit 30 via a communication line 19. Herein, the term "power" may refer to a concept including at least one of a current and a voltage to be applied to the rotary motor 24. For example, a power command signal may include at least one of information related to a current (a target current value) to be applied to the rotary motor 24 and information related to a voltage (a target voltage value) to be applied to the rotary motor 24.

Based on a power command signal from the control unit 40, the drive unit 30 may apply power to the rotary motor 24. For example, the drive unit 30 may perform pulse width modulation control (PWM control) so that a current having a target current value included in the power command signal from the control unit 40 flows through the rotary motor 24.

Figure 2:
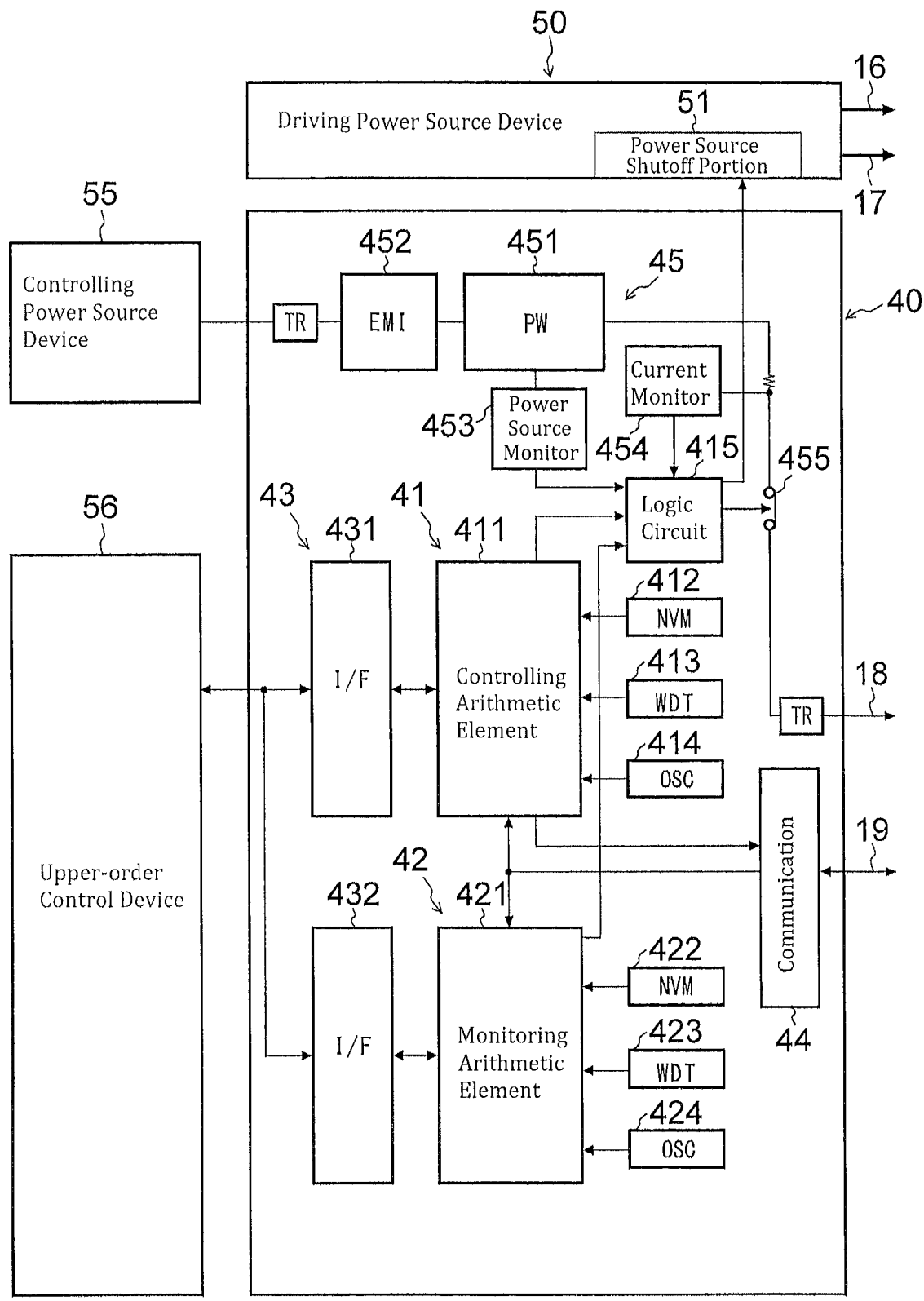
FIG. 2 is a view showing constituent components of the electric actuator driving and controlling device according to one embodiment, which are disposed in a fuselage.

(Configuration of Control Unit) Next, with reference to FIG. 2, a detailed description is given of a configuration of the control unit 40. FIG. 2 is a view showing those of the constituent components of the electric actuator driving and controlling device 25 that are disposed in the fuselage 11, such as the control unit 40. The control unit 40 may have a control element portion 41, a monitor element portion 42, an upper-order-side communication portion 43, a lower-order-side communication portion 44, and a power source portion 45.

Based on a command signal from the upper-order control device 56, monitor information from the drive unit 30, or the like obtained via the upper-order-side communication portion 43, the control element portion 41 may generate a power command signal for controlling the rotary motor 24. Furthermore, based on a command signal from the upper-order control device 56, monitor information from the drive unit 30, or the like, the control element portion 41 may generate a stop command signal for stopping an after-mentioned drive element portion 31 or the like of the drive unit 30 from operating. The monitor element portion 42 may input information from the drive unit 30 obtained via the lower-order-side communication portion 44 to the control element portion 41. Detailed configurations of the control element portion 41 and the monitor element portion 42 will be described later.

The upper-order-side communication portion 43 may receive a command signal from the upper-order control device 56 and input the command signal to the control element portion 41. Furthermore, the upper-order-side communication portion 43 may transmit a signal inputted from the control element portion 41 or the monitor element portion 42 to the upper-order control device 56. The upper-order-side communication portion 43 may include, for example, a communication IC such as a transceiver IC. It may also be possible that the upper-order-side communication portion 43 includes a communication IC 431 for communication between the upper-order control device 56 and the control element portion 41 and a communication IC 432 for communication between the upper-order control device 56 and the monitor element portion 42.

The lower-order-side communication portion 44 may receive a command signal such as a power command signal or a stop command signal from the control element portion 41 and transmit the command signal to the drive unit 30. Furthermore, the lower-order-side communication portion 44 may receive monitor information from the drive unit 30 and input the monitor information to the control element portion 41 and the monitor element portion 42. Similarly to the upper-order-side communication portion 43, the lower-order-side communication portion 44 may also include a communication IC such as a transceiver IC. The lower-order-side communication portion 44 may transmit a signal from the control element portion 41 to the drive unit 30 via the communication line 19. Preferably, the lower-order-side communication portion 44 may transmit a signal from the control element portion 41 to the drive unit 30 by serial communication. Thus, compared with a case where a signal is transmitted to the drive unit 30 by parallel communication, communication synchronization is facilitated, and a noise emission amount can be reduced.

The power source portion 45 may include a power source IC 451, an EMI filter 452, a power source monitor 453, a current monitor 454, and a power source shutoff switch 455. The power source IC 451 may receive supply of power from the controlling power source device 55 and supply the power to the other constituent components of the control unit 40. Furthermore, the power source IC 451 may supply power to the drive unit 30 via a controlling power source line 18. It may also be possible that a voltage of power supplied from the controlling power source device 55 is equal to or different from a voltage of power outputted by the power source IC 451.

The EMI filter 452 may be provided on an input side of the power source IC 451 and reduce noise included in power supplied from the controlling power source device 55. It may also be possible that a lightning arrestor TR is provided on an upstream side of the EMI filter 452.

The power source monitor 453, the current monitor 454, and the power source shutoff switch 455 may be provided on an output side of the power source IC 451. The power source monitor 453 may monitor a state of the output side of the power source IC 451, such as an output voltage of the power source IC 451. The current monitor 454 may monitor an output current of the power source IC 451. The current monitor 454 may be configured to calculate the output current based on, for example, a terminal voltage of a resistor inserted in a power source line connected to an output terminal of the power source IC 451.

The power source shutoff switch 455 may be a switch inserted in the power source line on the output side of the power source IC 451. In a case where a current value monitored by the current monitor 454 has exceeded a predetermined threshold value, the power source shutoff switch 455 may interrupt the power source line and thereby shut off power supply from the power source IC 451 to the drive unit 30 or the like. It may also be possible that in a case where a voltage value monitored by the power source monitor 453 has exceeded a predetermined threshold value, the power source shutoff switch 455 interrupts the power source line. Furthermore, it may also be possible that, in accordance with control from the control element portion 41, the power source shutoff switch 455 interrupts the power source line.

It may also be possible that, as shown in FIG. 2, a ground of the control unit 40 is connected to the drive unit 30 via a ground line 17.

[Control Element Portion] The following describes the control element portion 41 in detail. As shown in FIG. 2, the control element portion 41 may include a controlling arithmetic element 411, a non-volatile memory 412, a watchdog timer 413, an oscillator 414, and a logic circuit 415.

The controlling arithmetic element 411 may be formed of, for example, a CPU. Based on information stored in the non-volatile memory 412, a command signal from the upper-order control device 56, monitor information from the drive unit 30, or the like, the controlling arithmetic element 411 may generate a power command signal for controlling the rotary motor 24.

Furthermore, it may also be possible that the controlling arithmetic element 411 performs control of constituent components for shutting off a power source, such as the above-mentioned power source shutoff switch 455 of the power source portion 45 and a power source shutoff portion 51 of the driving power source device 50. For example, it may also be possible that in a case where monitor information from the drive unit 30 has deviated from a predetermined range, the controlling arithmetic element 411 controls the power source shutoff portion 51 via the logic circuit 415 to shut off power supply from the driving power source device 50 to the drive unit 30. This may apply to, for example, a case where a current flowing through the rotary motor 24 has exceeded a predetermined threshold value. Furthermore, it may also be possible that the controlling arithmetic element 411, upon detecting a communication error between the lower-order-side communication portion 44 and the drive unit 30, shuts off power supply from the driving power source device 50 to the drive unit 30.

The watchdog timer 413 may perform reset processing for resetting the controlling arithmetic element 411 in a case where a program being executed in the controlling arithmetic element 411 is brought into an invalid state such as a hang-up.

[Monitor Element Portion] The following describes the monitor element portion 42 in detail. As shown in FIG. 2, the monitor element portion 42 may include a monitoring arithmetic element 421, a non-volatile memory 422, a watchdog timer 423, and an oscillator 424. The monitoring arithmetic element 421 may be formed of, for example, a CPU. Based on information stored in the non-volatile memory 422, the monitoring arithmetic element 421 may process monitor information from the drive unit 30. Furthermore, the monitoring arithmetic element 421 may input the monitor information to the controlling arithmetic element 411. Furthermore, the monitoring arithmetic element 421 may transmit the monitor information to the upper-order control device 56 via the communication IC 432.

The watchdog timer 423 may perform reset processing for resetting the monitoring arithmetic element 421 in a case where a program executed in the monitoring arithmetic element 421 has fallen into an invalid state such as a hang-up.

Figure 3:
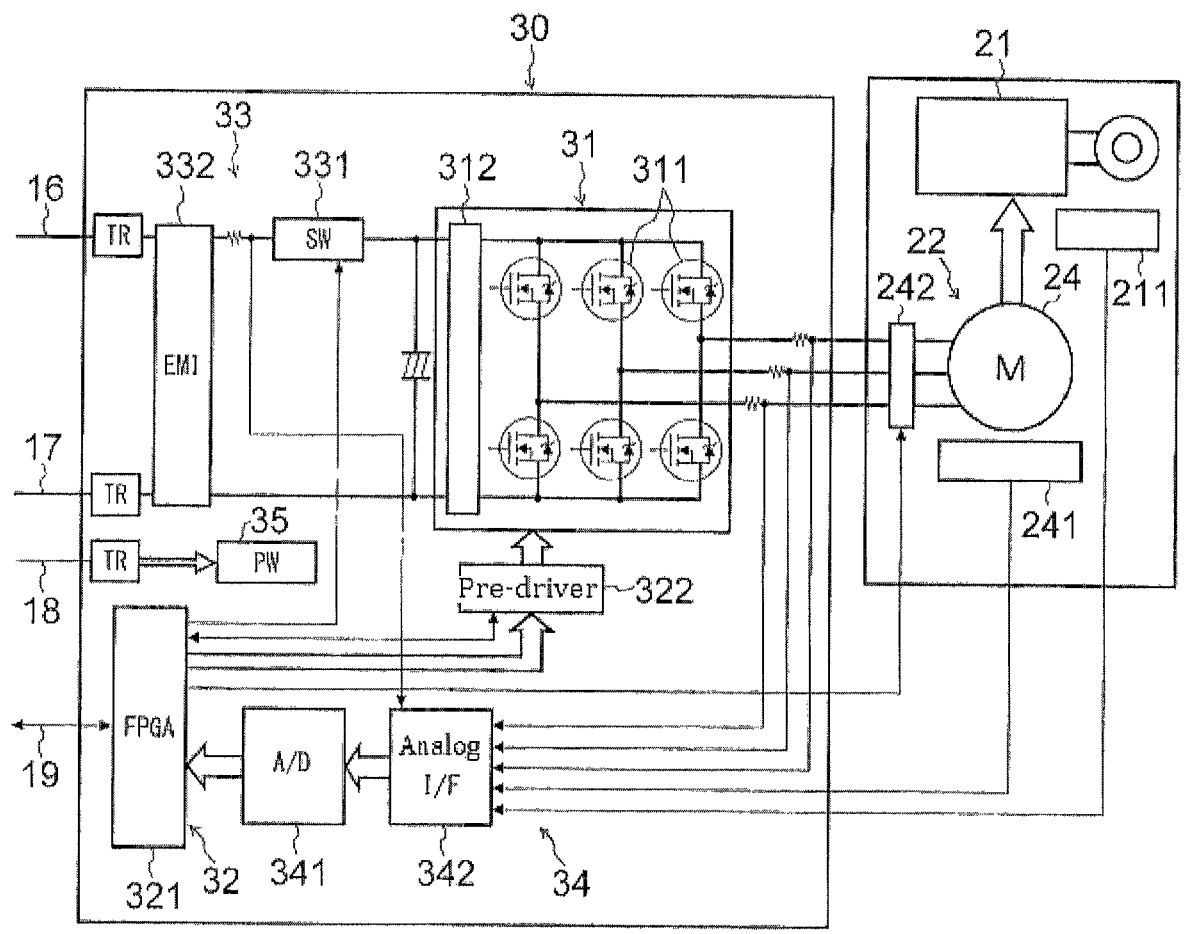
FIG. 3 is a view showing constituent components of the electric actuator driving and controlling device according to one embodiment, which are disposed in a wing portion.

(Configuration of Drive Unit) Next, with reference FIG. 3, a detailed description is given of a configuration of the control unit 30. FIG. 3 is a view showing a configuration of the drive unit 30 disposed inside each of the horizontal tail planes 121. FIG. 3 also shows a configuration of the rotary motor 24 driven by the drive unit 30.

The drive unit 30 may have a drive element portion 31, an interface portion 32, a driving power source portion 33, a monitor portion 34, and a controlling power source portion 35.

The drive element portion 31 may be configured to, based on a voltage or a current inputted, apply power to the rotary motor 24. For example, in a case where the rotary motor 24 is a three-phase alternating motor, the drive element portion 31 may be formed of, for example, a three-phase inverter circuit including six switching elements 311. The switching elements 311 may be formed of an IGBT (insulated gate bipolar transistor), a GaN (gallium nitride) transistor, a SiC (silicon carbide) transistor, or the like. The switching elements 311 may be electrically connected to an input terminal of the rotary motor 24. Based on a PWM signal from the interface portion 32, each of the switching elements 311 may be brought into an on state or an off state. It may also be possible that the drive element portion 31 includes a regenerative power consumption circuit 312 connected to the switching elements 311.

The interface portion 32 may include an arithmetic portion 321 communicably connected to the lower-order-side communication portion 44 of the control unit 40 via the communication line 19. The arithmetic portion 321 may include, for example, an FPGA. Based on information, such as a target current value, included in a power command signal from the control unit 40, the arithmetic portion 321 may generated a PWM signal to be inputted to each of the switching elements 311 of the drive element portion 31.

Figure 4:
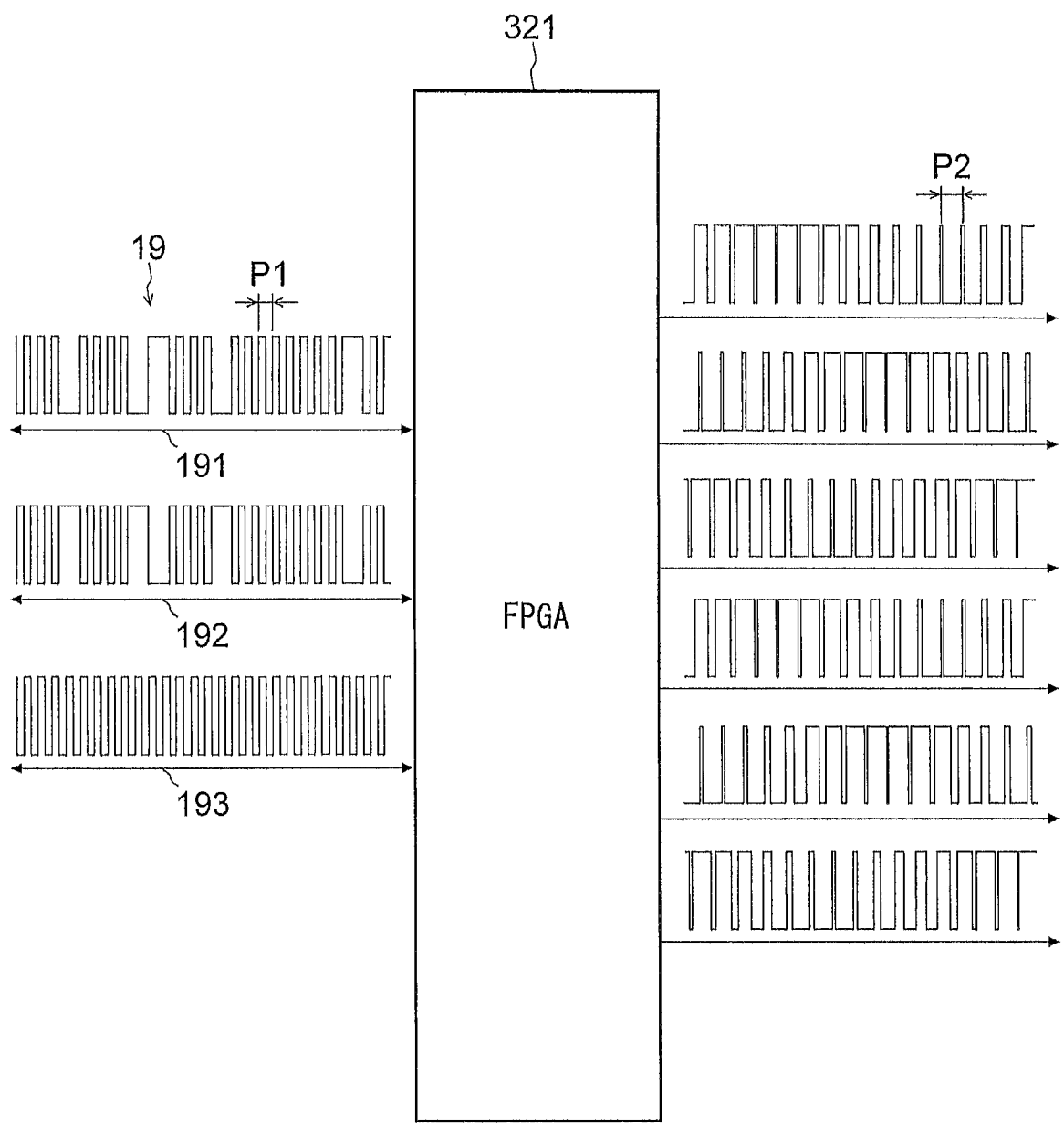
FIG. 4 is a view showing a signal inputted to an arithmetic portion of an interface portion of a drive unit shown in FIG. 3 and a signal outputted from the arithmetic portion.

FIG. 4 is a view showing a signal inputted to the arithmetic portion 321 and a signal outputted from the arithmetic portion 321. As shown in FIG. 4, the communication line 19 for performing serial communication between the arithmetic portion 321 and the lower-order-side communication portion 44 of the control unit 40 may include a pair of differential signal lines 191 and 192 and a clock line 193. Based on a signal from the control unit 40, the arithmetic portion 321 may generate a PWM signal and output the PWM signal to the drive element portion 31. As thus described, the arithmetic portion 321 can freely set a physical communication mode between itself and the control unit 40 to serial communication or the like, while performing parallel communication of a PWM signal between itself and the drive element portion 31.

Preferably, a basic period P1 of serial communication between the arithmetic portion 321 and the lower-order-side communication portion 44 of the control unit 40 may be different from a basic period P2 of a PWM signal. This can suppress a phenomenon in which serial communication between the arithmetic portion 321 and the lower-order-side communication portion 44 of the control unit 40 is obstructed by noise caused due to a PWM signal. Thus, communication reliability can be increased.

It may also be possible that the interface portion 32 includes a pre-driver 322 positioned between the arithmetic portion 321 and the drive element portion 31. The pre-driver 322 may amplify a PWM signal generated by the arithmetic portion 321 and input the amplified PWM signal to each of the switching elements 311 of the drive element portion 31. It may also be possible that in a case where an electrical output from the arithmetic portion 321 is large enough to be able to drive the switching elements 311, the pre-driver 322 is not provided.

It may also be possible that the interface portion 32 is configured so that, based on a signal from the control unit 40, it can stop the rotary motor 24 from operating. For example, the arithmetic portion 321 of the interface portion 32 may be configured so that it can control a dynamic brake 242 provided at the rotary motor 24 to stop the rotary motor 24 from operating. Typically, the dynamic brake 242 may be provided in a case where the actuation mechanism 21 is of the electrically operated type.

The driving power source portion 33 may supply drive power supplied via the driving power source line 16 to the drive element portion 31. It may also be possible that the driving power source portion 33 includes a power source shutoff switch 331. In a case where the actuation mechanism 21, the rotary motor 24, or any of the constituent components of the electric actuator driving and controlling device 25 has fallen into an abnormal state, the power source shutoff switch 331 may interrupt the power source line and thereby shut off power supply to the drive element portion 31.

Furthermore, it may also be possible that the driving power source portion 33 includes an EMI filter 332 and a lightning arrestor TR.

The monitor portion 34 may be configured to obtain monitor information related to an operation state of each of the constituent components of the electric actuator driving and controlling device 25. For example, based on a terminal voltage of a resistor inserted in a connection line between the drive element portion 31 and the rotary motor 24, the monitor portion 34 may obtain information related to a current value of the rotary motor 24. Furthermore, it may also be possible that, based on a terminal voltage of a resistor inserted in a power source line of the driving power source portion 33, the monitor portion 34 obtains information related to a current value of the driving power source portion 33.

Furthermore, it may also be possible that the monitor portion 34 is configured to obtain monitor information related to respective operation states of the actuation mechanism 21 and the rotary motor 24. For example, the rotary motor 24 may be provided with a rotation angle detector 241 configured to detect a rotation angle of a rotary shaft of the rotary motor 24. The rotation angle detector 241 may be formed of, for example, a resolver. In this case, based on a signal from the rotation angle detector 241, the monitor portion 34 can obtain information related to a position and a speed of the rotary shaft of the rotation motor 24. Furthermore, the actuation mechanism 21 may be provided with a position detector 211 configured to detect a position of the cylinder of the actuation mechanism 21. In this case, based on a signal from the position detector 211, the monitor portion 34 can obtain information related to a position of the actuation mechanism 21.

The monitor portion 34 may include, for example, an AD converter 341 and an analog interface circuit 342. The analog interface circuit 342 may process an analog signal obtained from the resistor, the rotation angle detector 241, and the position detector 211. For example, the analog interface circuit 342 may amplify the analog signal. The AD converter 341 may convert an analog signal from the analog interface circuit 342 into a digital signal and input the digital signal to the interface portion 32. After that, the monitor information may be transmitted to the control unit 40 via the communication line 19.

The controlling power source portion 35 may supply control power supplied via the controlling power source line 18 to the interface portion 32, the monitor portion 34, and so on.

Figure 5:
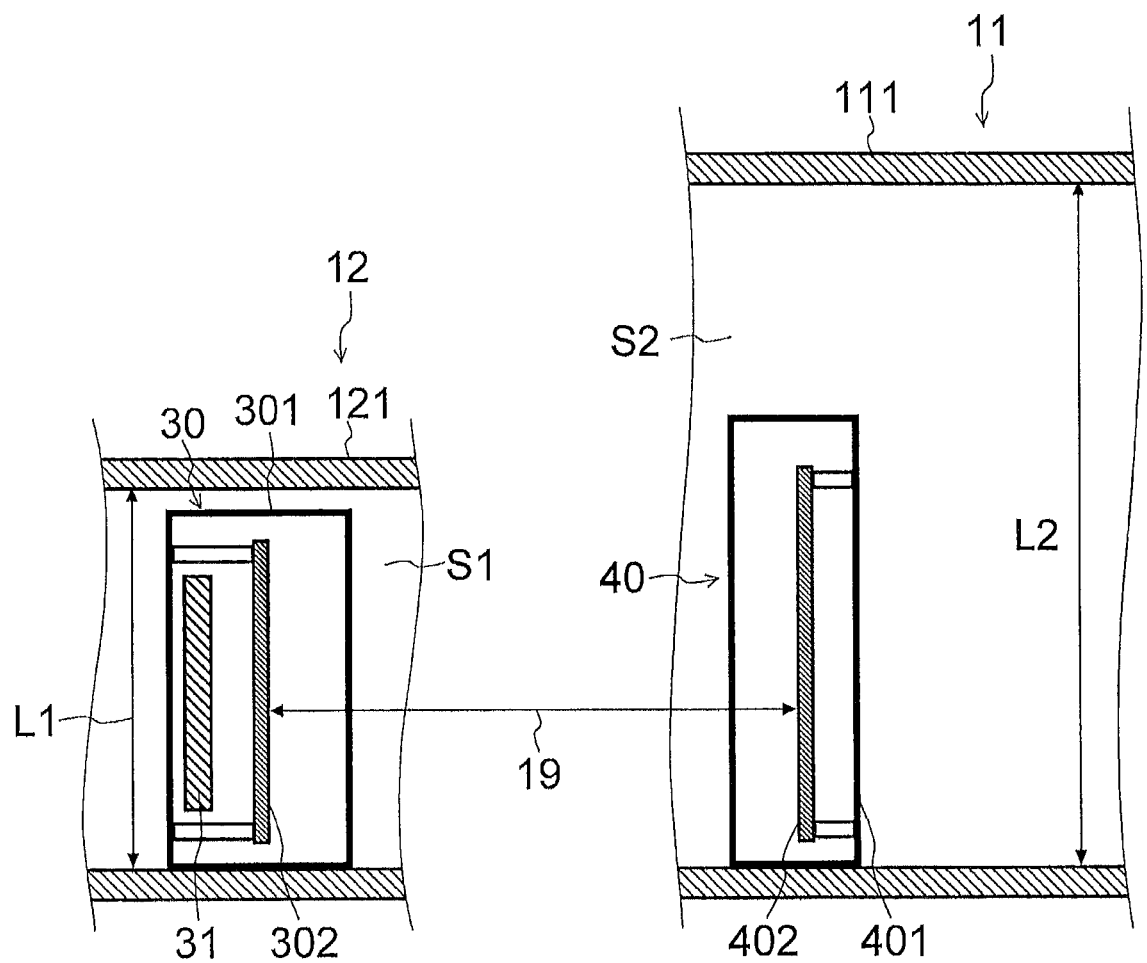
FIG. 5 is a longitudinal sectional view showing one example of arrangements of the drive unit and a control unit according to an embodiment of the present invention.

(Arrangements of Drive Unit and Control Unit) Next, a description is given of arrangements of the drive unit 30 and the control unit 40. FIG. 5 is a longitudinal sectional view showing one example of arrangements of the drive unit 30 and a control unit 40.

As shown in FIG. 5, the drive unit 30 may have, for example, a housing 301 disposed inside each of the horizontal tail planes 121, and a substrate 302 and the drive element portion 31 that are housed in the housing 301. In the substrate 302, there may be provided the interface portion 32, the driving power source portion 33, the monitor portion 34, and the controlling power source portion 35, and so on, which are described above.

As shown in FIG. 5, the control unit 40 may have, for example, a housing 401 disposed in the electrical bay 111 of the aircraft 10 and a substrate 402 housed in the housing 401. In the substrate 402, there may be provided the control element portion 41, the monitor element portion 42, the upper-order-side communication portion 43, the lower-order-side communication portion 44, and the power source portion 45, which are described above. The control unit 40 may be communicable with the drive unit 30 disposed inside each of the horizontal tail planes 121 via the communication line 19. Though not shown, it may also be possible that the driving power source device 50, the controlling power source device 55, the upper-order control device 56, and so on may further be disposed inside the electrical bay 111 in which the control unit 40 is disposed.

By the way, the wing portion 12 including the horizontal tail planes 121 and so on may be configured to be thin for the purpose of, for example, reducing air resistance, and thus compared with a capacity and dimensions of a space inside the fuselage 11, such as the electrical bay 111, a capacity and dimensions of a space inside the wing portion 12 may be limited. For example, a height L1 of a space inside each of the horizontal tail planes 121 may be smaller than a height L2 of a space inside the electrical bay 111. In the following description, in some cases, a dimensionally limited space such as inside each of the horizontal tail planes 121 is referred to as a first space S1, and a space dimensionally limited only mildly compared with the each of the horizontal tail planes 121 is referred to as a second space S2.

According to this embodiment, the electric actuator driving and controlling device 25 may be structurally divided into the drive unit 30 and the control unit 40, with the drive unit 30 disposed in each of the horizontal tail planes 121 and the control unit 40 disposed in the electrical bay 111. Thus, the number of components constituting the drive unit 30 may be suppressed to a requisite minimum, so that a volume of the drive unit 30 can be reduced. This can facilitate layout designing of a space inside each of the horizontal tail planes 121, in which the drive unit 30 is disposed. This can also reduce a capacity required for the horizontal tail planes 121 and thus can reduce a size of the horizontal tail planes 121.

Comparative Embodiment

Figure 6:
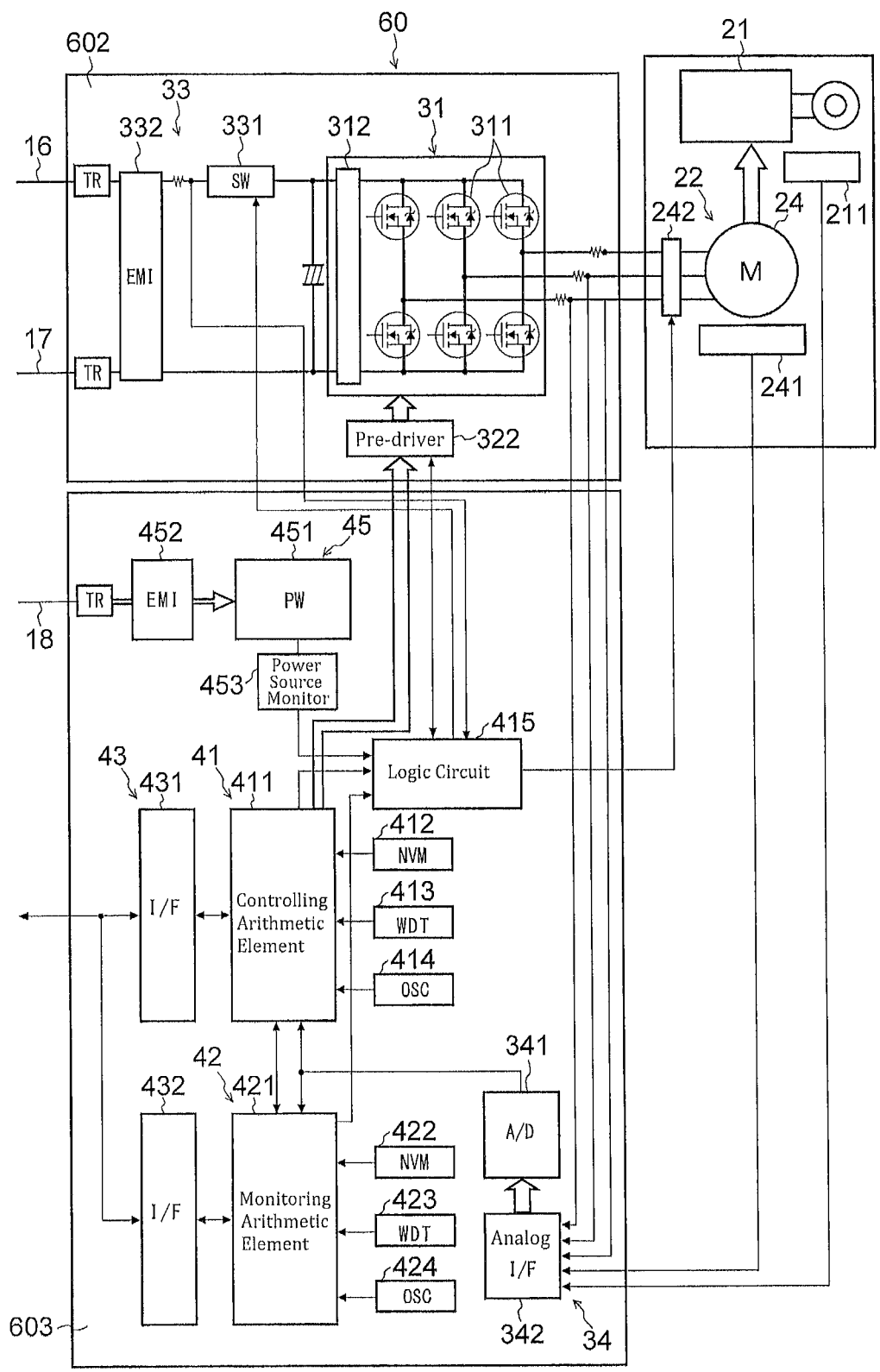
FIG. 6 is a view showing an electric actuator driving and controlling device according to a comparative embodiment.
Figure 7:
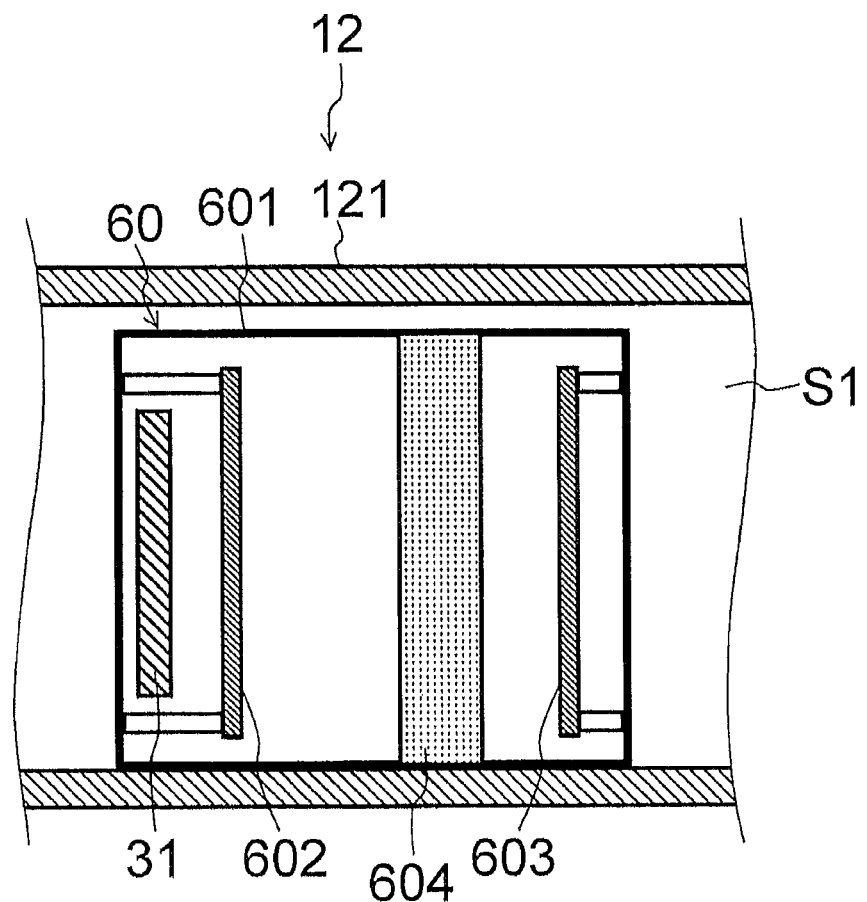
FIG. 7 is a longitudinal sectional view showing an arrangement of the electric actuator driving and controlling device according to the comparative embodiment.

In order to describe in more detail the effects provided by the embodiment of the present invention, a description is given of a conventional electric actuator driving and controlling device 60 as a comparative embodiment. FIG. 6 is a view showing the electric actuator driving and controlling device 60 according to the comparative embodiment. Furthermore, FIG. 7 is a longitudinal sectional view showing an arrangement of the electric actuator driving and controlling device 60 according to the comparative embodiment. Furthermore, in the drawings referred to in the comparative embodiment, constituent components having the same functions as in the foregoing embodiment are denoted by the same reference characters, and duplicate descriptions thereof are omitted.

The electric actuator driving and controlling device 60 according to the comparative embodiment may be provided with functions of both the drive unit 30 and the control unit 40 according to the foregoing embodiment. Specifically, as shown in FIG. 6, the electric actuator driving and controlling device 60 may have a drive element portion 31, a pre-driver 322, a driving power source portion 33, a monitor portion 34, a control element portion 41, a monitor element portion 42, an upper-order-side communication portion 43, and a power source portion 45. Furthermore, in the comparative embodiment, as shown in FIG. 7, the electric actuator driving and controlling device 60 as a whole may be disposed inside each of the horizontal tail planes 121.

In an electronic component such as an integrated circuit, generally, the higher an integration degree thereof, the higher an amount of heat generated per unit area, and thus a tolerable environmental temperature may be decreased. That is, heat resistance is decreased. For example, a controlling arithmetic element 411 and a non-volatile memory 412 of the control element portion 41, a monitoring arithmetic element 421 and a non-volatile memory 422 of the monitor element portion 42, and so on may be electronic components having a high integration degree and thus having low heat resistance. Meanwhile, a high voltage and a high current may be applied to switching elements 311 of the drive element portion 31, thus causing a large switching loss and large heat generation. Because of this, in a case where the drive element portion 31, the control element portion 41, and the monitor element portion 42 are disposed in the same space, it may be required that a substrate in which the control element portion 41, the monitor element portion 42, and so on are disposed be placed away from the drive element portion 31. For example, as shown in FIG. 7, the electric actuator driving and controlling device 60 according to the comparative embodiment may have a housing 601, and the drive element portion 31, a first substrate 602, and a second substrate 603 that are housed in the housing 601. In the first substrate 602, the pre-driver 322, the driving power source portion 33, and so on may be provided, and the first substrate 602 may be disposed in a vicinity of the drive element portion 31. In the second substrate 603, the monitor portion 34, the control element portion 41, the monitor element portion 42, the upper-order-side communication portion 43, the power source portion 45, and so on are provided, and the second substrate 603 may be disposed away from the drive element portion 31. Furthermore, between the drive element portion 31 and the second substrate 603, a heat shutoff space 604 may be provided in order to suppress conduction of heat generated in the drive element portion 31 to the second substrate 603. The heat shutoff space 604 may be, for example, a space in which a member having a heat insulation property is disposed.

As described above, in the comparative embodiment, in order to protect constituent components sensitive to heat, such as the control element portion 41 and the monitor element portion 42, from heat generated in the drive element portion 31, there arises a limitation on arrangements of the control element portion 41 and the monitor element portion 42 with respect to the drive element portion 31. As a result, in each of the horizontal tail planes 121, a volume occupied by the electric actuator driving and controlling device 60 having the drive element portion 31, the control element portion 41, and the monitor element portion 42 may be increased. Because of this, a capacity required for the horizontal tail planes 121 may be increased, rendering it difficult to reduce a size of the horizontal tail planes 121.

In contrast, according to the embodiment of the present invention, the control unit 40 including the control element portion 41 and the monitor element portion 42 may be disposed in the fuselage 11, and thus the number of constituent components disposed in each of the horizontal tail planes 121 may be decreased. Furthermore, the drive unit 30 disposed in each of the horizontal tail planes 121 may be configured so as not to include an electronic component sensitive to heat, and thus the need for the heat shutoff space 604 provided in the comparative embodiment can be eliminated. By the configuration thus described, a volume occupied by the drive unit 30 disposed inside each of the horizontal tail planes 121 can be reduced. This can reduce a capacity required for the horizontal tail planes 121 and thus can reduce a size of the horizontal tail planes 121. Furthermore, since the need for the heat shutoff space 604 can be eliminated, a total of a volume occupied by the drive unit 30 and a volume occupied by the control unit 40 can also be made smaller than a volume occupied by the electric actuator driving and controlling device 60 in the comparative embodiment.

Furthermore, compared with a space inside the fuselage 11, such as the electrical bay 111, a space inside the wing portion 12, such as each of the horizontal tail planes 121, may be a space harsh in terms also of an environment. For example, the height L1 of a space inside each of the horizontal tail planes 121 may be smaller than the height L2 of a space inside the electrical bay 111, and thus a temperature in the space inside each of the horizontal tail planes 121 may be likely to be increased due to heat generation by an electronic component or the like. That is, compared with a space inside the fuselage 11, a space inside the wing portion 12 may be a thermally harsh high-temperature environment.

Furthermore, in recent years, as a material of the wing portion 12 including the horizontal tail planes 121 and so on, a composite material has been used in order to achieve weight reduction. Meanwhile, generally, a thermal conductivity of a composite material is lower than a thermal conductivity of a metal material. Therefore, heat generated inside the wing portion 12 may hardly be dissipated to the exterior by conduction heat transfer. As a method for dissipating heat inside the wing portion 12 including the horizontal tail planes 121 and so on, it may be conceivable to provide the wing portion 12 with a vent and dissipate the heat by convection heat transfer therethrough. Providing the wing portion 12 with a vent, however, may disadvantageously increase air resistance of the wing portion 12, resulting in a decrease in fuel efficiency of the aircraft 10. As thus described, an inside of the wing portion 12 may be a space thermally harsh due to its dimensions and also a space whose thermal environment can hardly be improved.

Herein, according to the embodiment of the present invention, the control unit 40 including the constituent components sensitive to heat, such as the control element portion 41 and the monitor element portion 42, may be structurally separated from the drive unit 30 and disposed in a space in the fuselage 11 such as the electrical bay 111. This can easily improve a thermal environment around the control unit 40. Thus, reliability of the control unit 40 can be increased.

Furthermore, the wing portion 12 including the horizontal tail planes 121 and so on may protrude from the fuselage 11 with respect to the exterior. For this reason, conceivably, compared with a space inside the fuselage 11, a space inside the wing portion 12 may be likely to be reached by cosmic rays. Furthermore, in a case where a composite material is used as a material of the wing portion 12 as described above, a space inside the wing portion 12 may become more likely to be reached by cosmic rays. As thus described, compared with an inside of the fuselage 11, an inside of the wing portion 12 may be a space harsh in terms also of cosmic rays. In an electronic component such as an integrated circuit, conceivably, the higher an integration degree thereof, the more likely an abnormality is to occur due to cosmic rays.

Herein, according to the embodiment of the present invention, the control unit 40 including constituent components sensitive to cosmic rays, such as the control element portion 41 and the monitor element portion 42, may be structurally separated from the drive unit 30 and disposed in a space in the fuselage 11 such as the electrical bay 111. This can easily improve an environment related to cosmic rays around the control unit 40. Thus, reliability of the control unit 40 can be increased.

Measure for Handling Communication Error

In the embodiment of the present invention, as described above, the control unit 40 may be structurally separated from the drive unit 30 and disposed in a space in the fuselage 11. Accordingly, it may be required that a communication technique having predetermined reliability be established between the drive unit 30 and the control unit 40. It may not be easy, however, to completely eliminate communication malfunctions. With this in view, in the embodiment of the present invention, preferably, the electric actuator driving and controlling device 25 may be provided beforehand with an error-handling measure for handling a possible communication error between the drive unit 30 and the control unit 40. The following describes an example of such an error-handling measure.

First, a description is given of a case where the drive unit 30 has detected a communication error between the drive unit 30 and the control unit 40. Herein, there is described a case where communication between the drive unit 30 and the control unit 40 is serial communication such as RS-232C. In this case, the arithmetic portion 321 of the interface portion 32 of the drive unit 30 can determine whether the communication is in a normal state or an erroneous state depending on whether or not, after a signal is transmitted to the lower-order-side communication portion 44 of the control unit 40, a response message is appropriately sent back from the lower-order-side communication portion 44.

Figure 8:
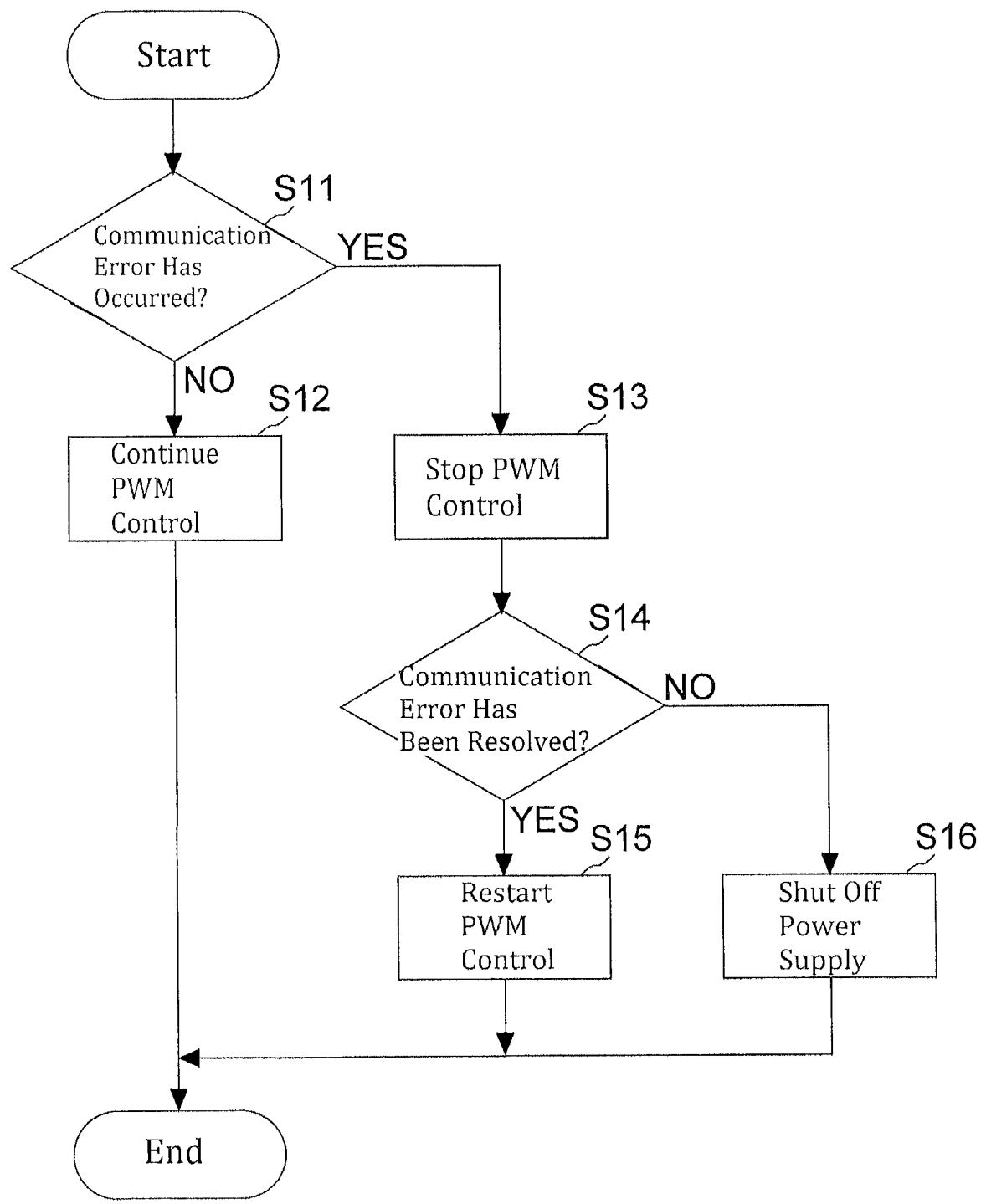
FIG. 8 is a flow chart for illustrating one example of an operation of the drive unit in a case where a communication error has occurred.

FIG. 8 is a flow chart for illustrating one example of an operation of the drive unit 30 in a case where a communication error has occurred. The arithmetic portion 321 of the drive unit 30 may repeatedly confirm, for example, at fixed intervals whether or not a communication error has occurred (S11). In a case where no communication error has occurred (NO at S11), the arithmetic portion 321 may continue to perform PWM control of the drive element portion 31 (S12). On the other hand, in a case where the arithmetic portion 321 has detected a communication error (YES at S14), the arithmetic portion 321 may stop performing PWM control of the drive element portion 31 (S13). For example, the arithmetic portion 321 may output a signal for bringing the switching elements 311 of the drive element portion 31 into an off state.

After that, the arithmetic portion 321 may repeatedly confirm, for example, at fixed intervals whether or not a communication error state between itself and the lower-order-side communication portion 44 has been resolved (S14). In a case where the communication error state has been confirmed to be resolved (YES at S14), the arithmetic portion 321 may restart performing PWM control of the drive element portion 31 (S15). On the other hand, in a case where the communication error state has been continued over a fixed period of time, the arithmetic portion 321 may shut off power supply to the drive element portion 31 (S16). For example, the arithmetic portion 321 may control the power source shutoff switch 331 to shut off power supply from the driving power source portion 33 to the drive element portion 31. This can prevent the drive element portion 31 from becoming uncontrollable due to a communication error.

Next, a description is given of a case where the control unit 40 has detected a communication error between the drive unit 30 and the control unit 40. The control unit 40 can determine whether the communication is in a normal state or an erroneous state depending on whether or not, after the lower-order-side communication portion 44 has transmitted a signal to the interface portion 32 of the drive unit 30, a response message is appropriately sent back from the interface portion 32 to the lower-order-side communication portion 44.

Figure 9:
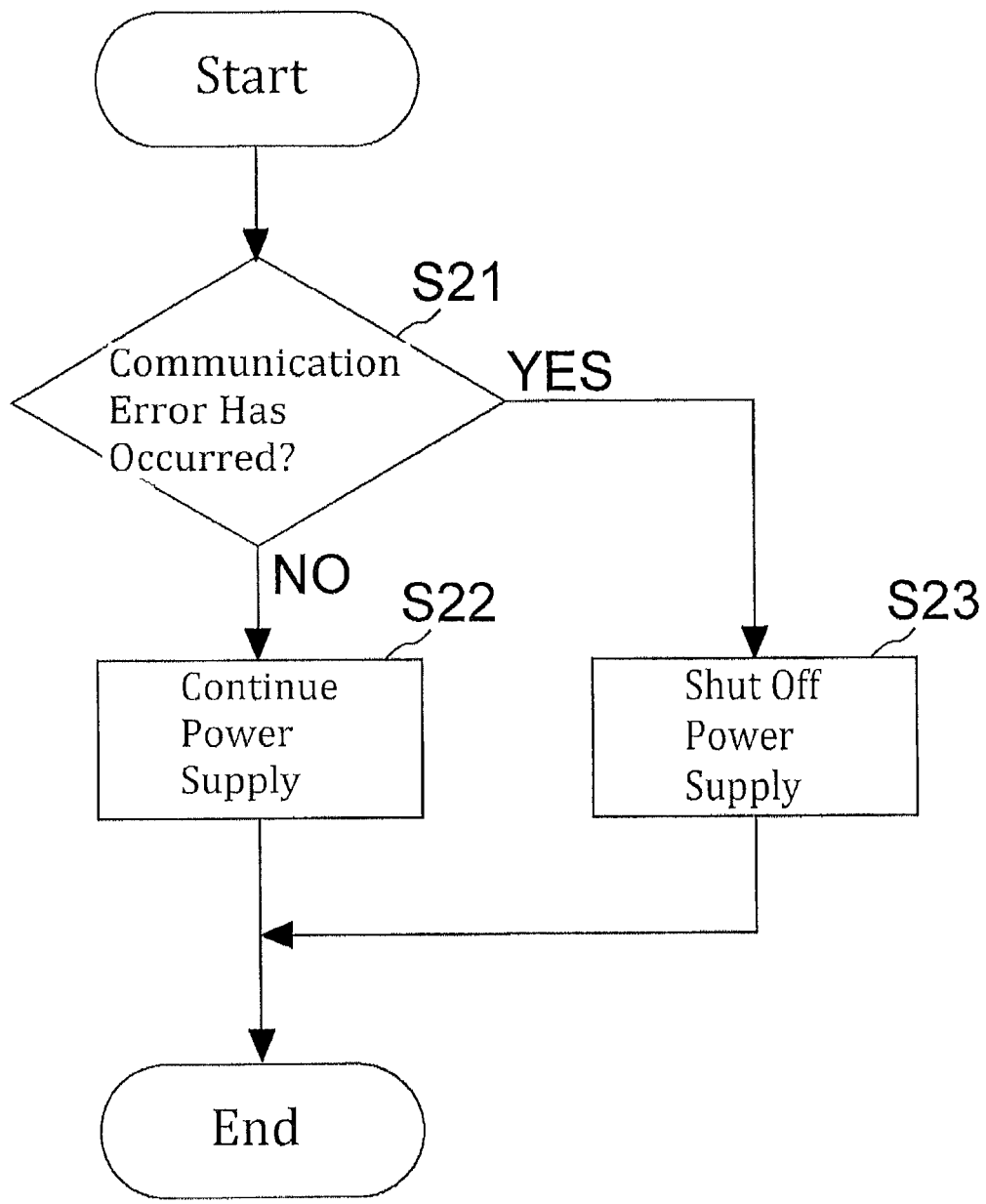
FIG. 9 is a flow chart for illustrating one example of an operation of the control unit in the case where a communication error has occurred.

FIG. 9 is a flow chart for illustrating one example of an operation of the control unit 40 in a case where a communication error has occurred. For example, the control element portion 41 of the control unit 40 may repeatedly confirm, for example, at fixed intervals whether or not a communication error has occurred in the lower-order-side communication portion 44 (S21). In a case where no communication error has occurred (NO at S21), the control element portion 41 may continue power supply to the drive unit 30 (S22). On the other hand, in a case where a communication error has been detected (YES at S21), the control element portion 41 may shut off power supply to the drive unit 30 (S23). For example, the control element portion 41 may control the power source shutoff portion 51 to shut off power supply from the driving power source device 50 to the drive unit 30. This can prevent the drive element portion 31 from becoming uncontrollable due to a communication error.

Various modifications can be made to the foregoing embodiment. While referring to the appended drawings as required, the following describes modification examples. In the following description and the drawings used therein, parts that can be configured in a similar manner as in the foregoing embodiment are denoted by the same reference characters as those used for corresponding parts in the foregoing embodiment, and duplicate descriptions thereof are omitted. Furthermore, when it is obvious that the working effects obtained in the foregoing embodiment can be obtained also in the modification examples, a description thereof is possibly omitted.

First Modification Example

The foregoing embodiment has shown an example in which communication between the interface portion 32 of the drive unit 30 and the lower-order-side communication portion 44 of the control unit 40 is electrical communication, particularly, electrical serial communication. Communication between the interface portion 32 and the lower-order-side communication portion 44 is not limited to electrical communication. This modification example explains an example in which communication between the interface portion 32 and the lower-order-side communication portion 44 is optical communication.

Figure 10:
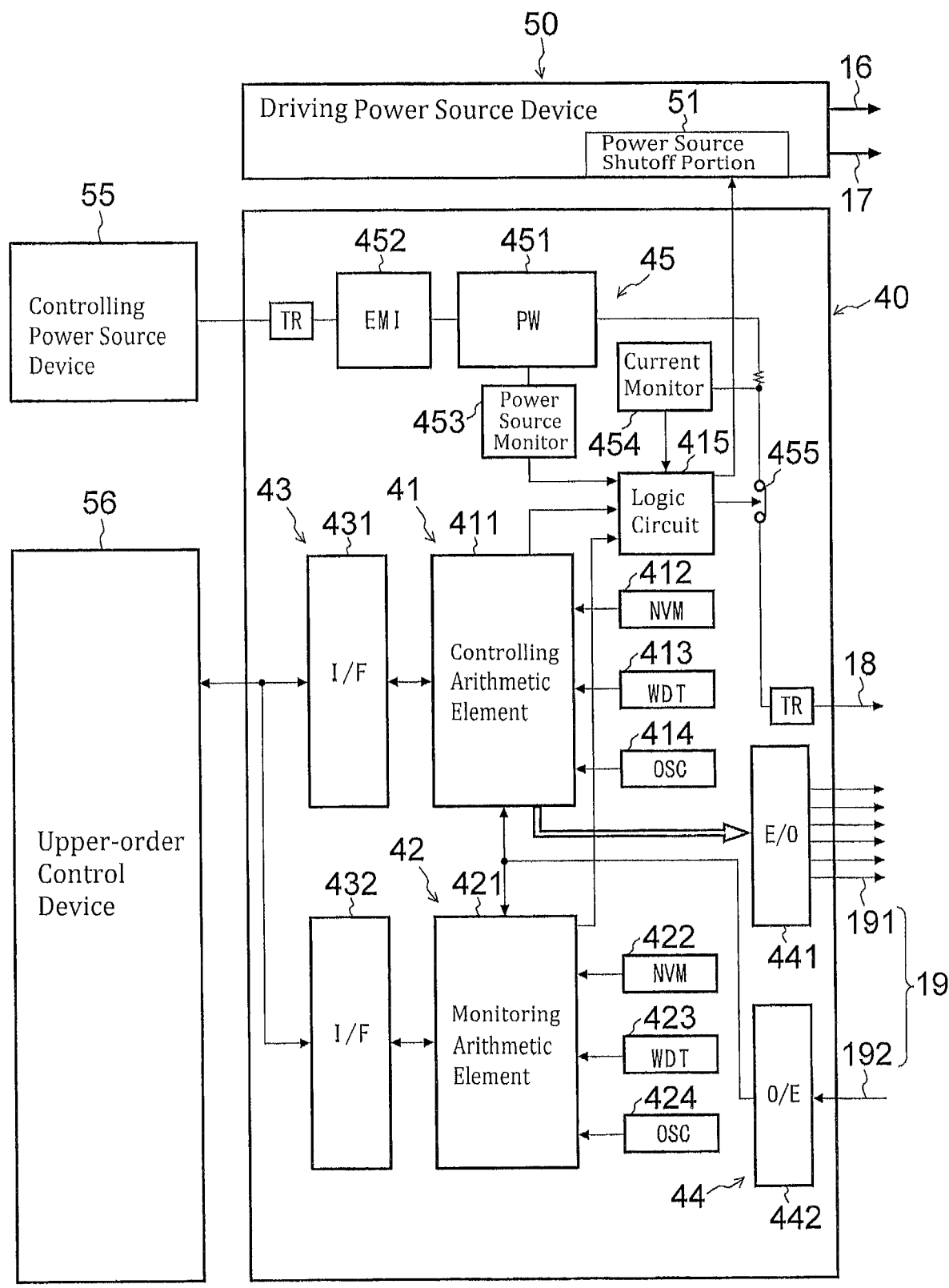
FIG. 10 is a view showing constituent components of an electric actuator driving and controlling device according to a first modification example, which are disposed in a fuselage.

FIG. 10 is a view showing those of the constituent components of the electric actuator driving and controlling device 25 that are disposed in the fuselage 11, such as the control unit 40. As shown in FIG. 10, the lower-order-side communication portion 44 of the control unit 40 may include an E/O converter 441.

Based on a command signal from the upper-order control device 56, monitor information from the drive unit 30, or the like obtained via the upper-order-side communication portion 43, the control element portion 41 may calculate a target current value for the rotary motor 24. Furthermore, based on the target current value for the rotary motor 24, the control element portion 41 may generate a PWM signal for controlling the switching elements 311 of the drive element portion 31 of the drive unit 30 and input the PWM signal to the E/O converter 441. As thus described, in this modification example, a PWM signal for controlling the switching elements 311 may be used as a power command signal to be transmitted by the control unit 40 to the drive unit 30.

The E/O converter 441 of the lower-order-side communication portion 44 may convert an electrical PWM signal from the control element portion 41 into an optical signal. Then, the E/O converter 441 may transmit optical PWM signals in a number corresponding to the number of the switching elements 311 of the drive element portion 31 of the drive unit 30 respectively to the drive unit 30. As thus described, in this modification example, the control unit 40 may transmit a PWM signal to the drive unit 30 by optical parallel communication.

Figure 11:
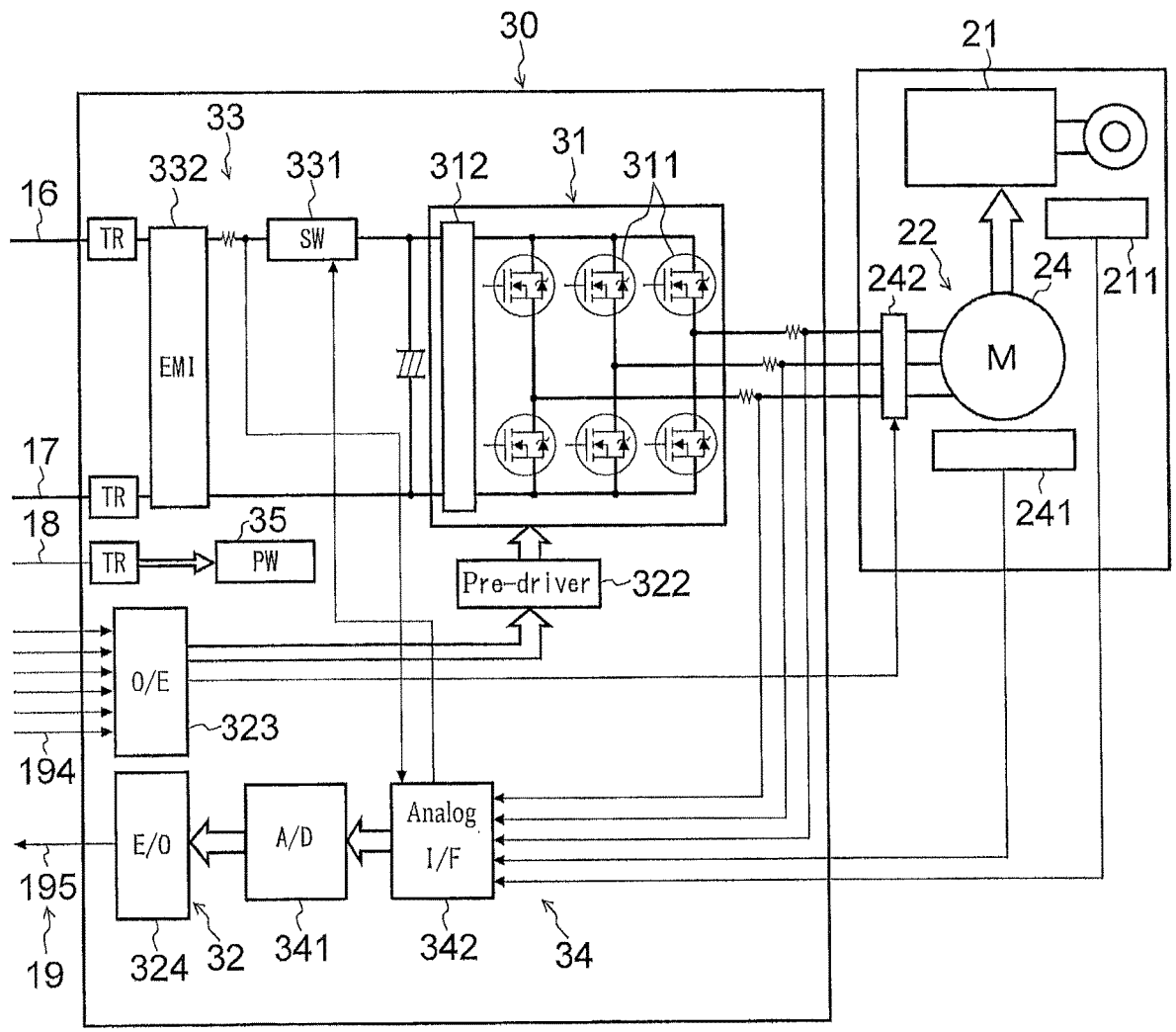
FIG. 11 is a view showing constituent components of the electric actuator driving and controlling device according to the first modification example, which are disposed in a wing portion.

FIG. 11 is a view showing a configuration of the drive unit 30 disposed in each of the horizontal tail planes 121. As shown in FIG. 11, the interface portion 32 of the drive unit 30 may include an O/E converter 323. The O/E converter 323 may receive an optical PWM signal from the E/O converter 441 of the control unit 40, convert it into an electrical PWM signal, and input the electrical PWM signal to the pre-driver 322. It may also be possible that in a case where an electrical output from the O/E converter 323 is large enough to be able to drive the switching elements 311, the pre-driver 322 is not provided.

Figure 12:
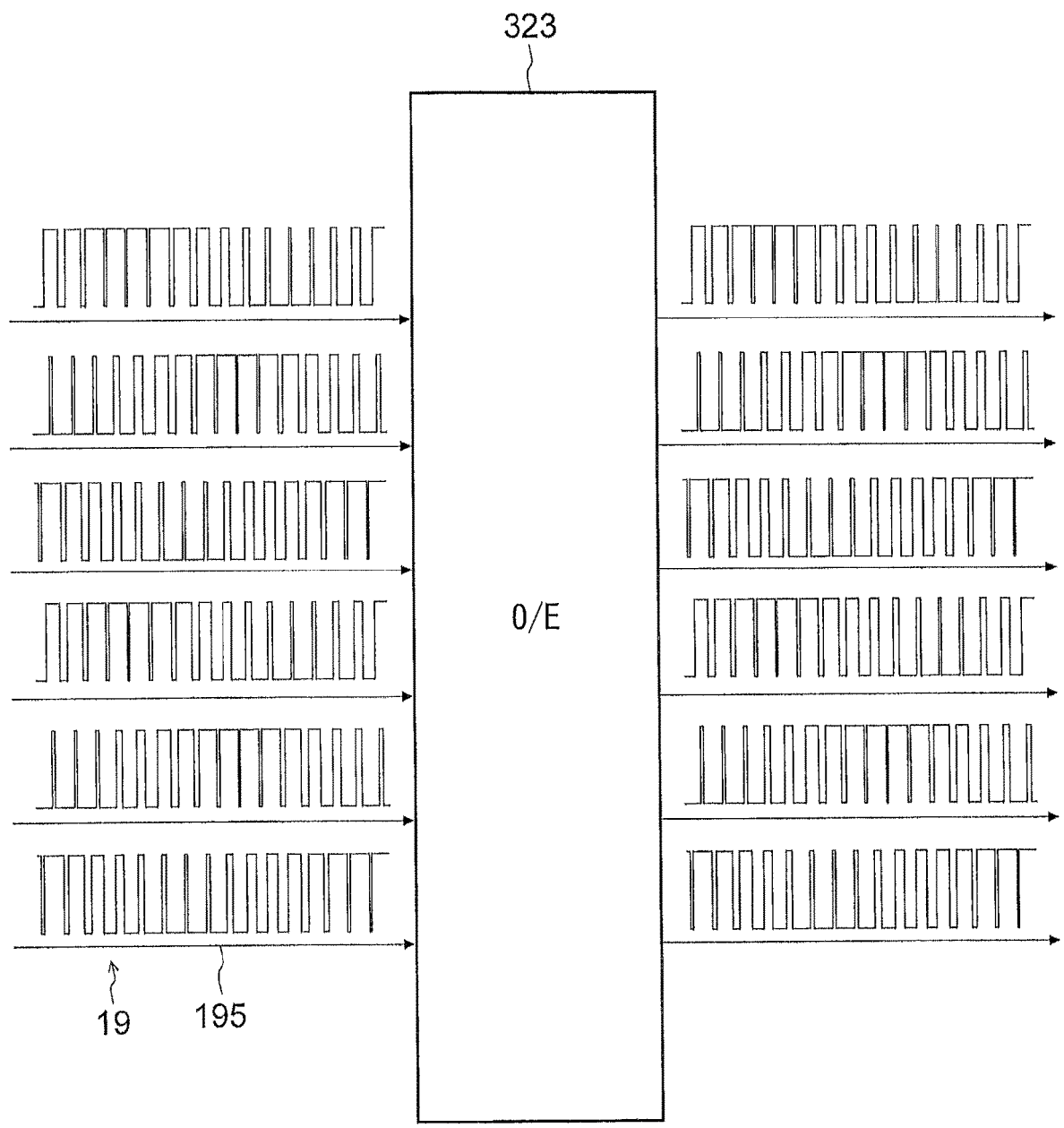
FIG. 12 is a view showing a signal inputted to a communication IC of an interface portion of a drive unit shown in FIG. 11 and a signal outputted from the communication IC.

FIG. 12 is a view showing a signal inputted to the O/E converter 323 of the interface portion 32 and a signal outputted from the O/E converter 323. As shown in FIG. 12, the communication line 19 for performing communication between the interface portion 32 of the drive unit 30 and the lower-order-side communication portion 44 of the control unit 40 may include optical lines 195 in a number corresponding to the number of PWM signals. The optical lines 195 may be formed of, for example, an optical fiber.

In this modification example, the control unit 40 may transmit a power command signal to the drive unit 30 by optical communication, and thus there can be suppressed a phenomenon in which communication from the control unit 40 to the drive unit 30 is obstructed by noise caused due to an electrical PWM signal in the drive element portion 31 of the drive unit 30. Thus, communication reliability can be increased. Also, there can be suppressed a phenomenon in which communication from the control unit 40 to the drive unit 30 emits electrical noise to surroundings.

Optical communication from the control unit 40 to the drive unit 30 is not limited to parallel communication.

Though not shown, it may also be possible that optical communication from the control unit 40 to the drive unit 30 is serial communication.

Furthermore, it may also be possible that communication for transmitting monitor information obtained by the monitor portion 34 of the drive unit 30 to the control unit 40 is optical communication. In this case, as shown in FIG. 11, the interface portion 32 of the drive unit 30 may include an E/O converter 324 configured to convert an electrical signal from the AD converter 341 into an optical signal. Furthermore, as shown in FIG. 10, the lower-order-side communication portion 44 of the control unit 40 may include an O/E converter 442 configured to receive an optical signal from the E/O converter 324 and convert it into an electrical signal. It may also be possible that optical communication between the E/O converter 324 and the O/E converter 442 is serial communication or parallel communication.

Second Modification Example

Figure 13:
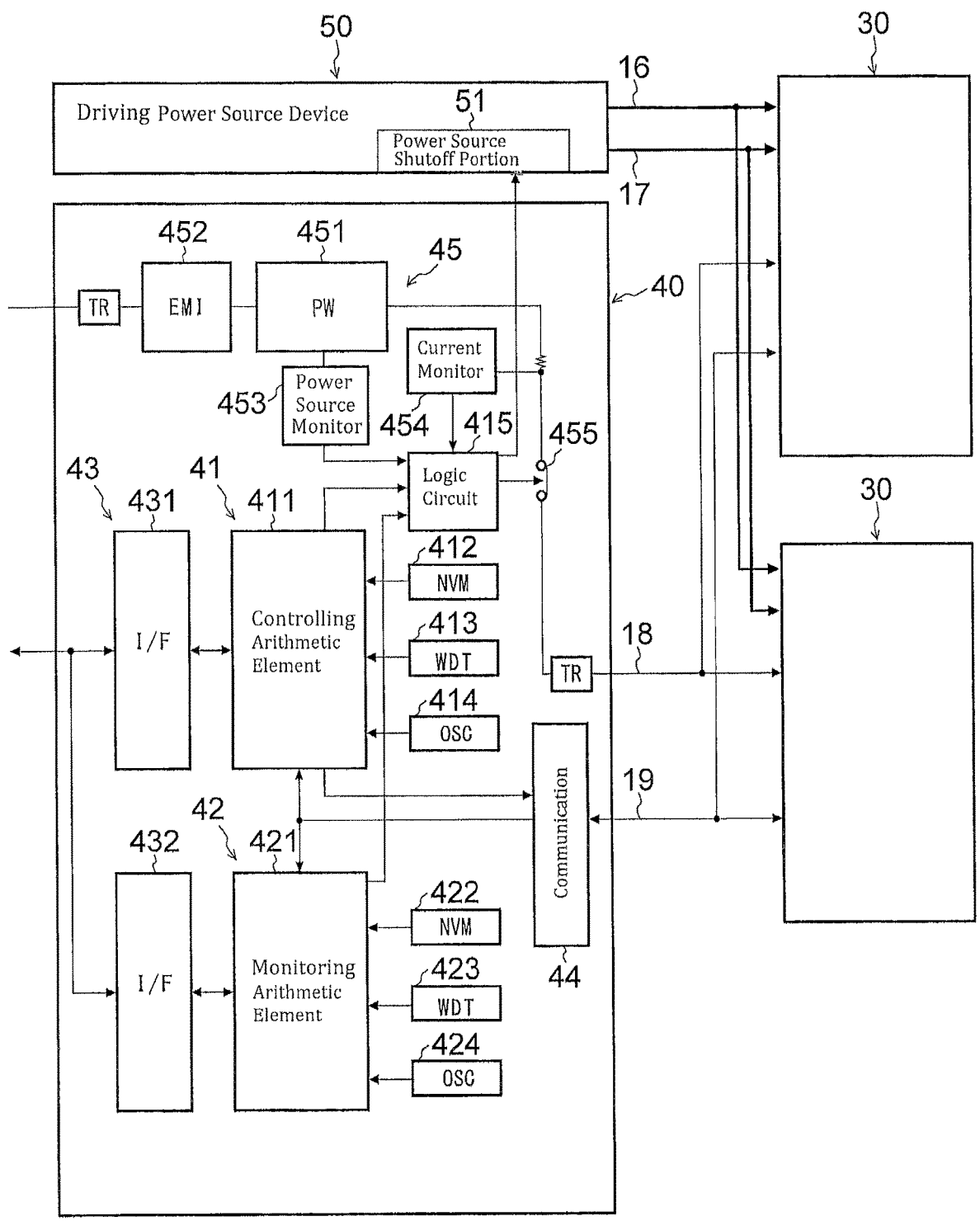
FIG. 13 is a view showing an electric actuator driving and controlling device according to a second modification example.
Figure 14:
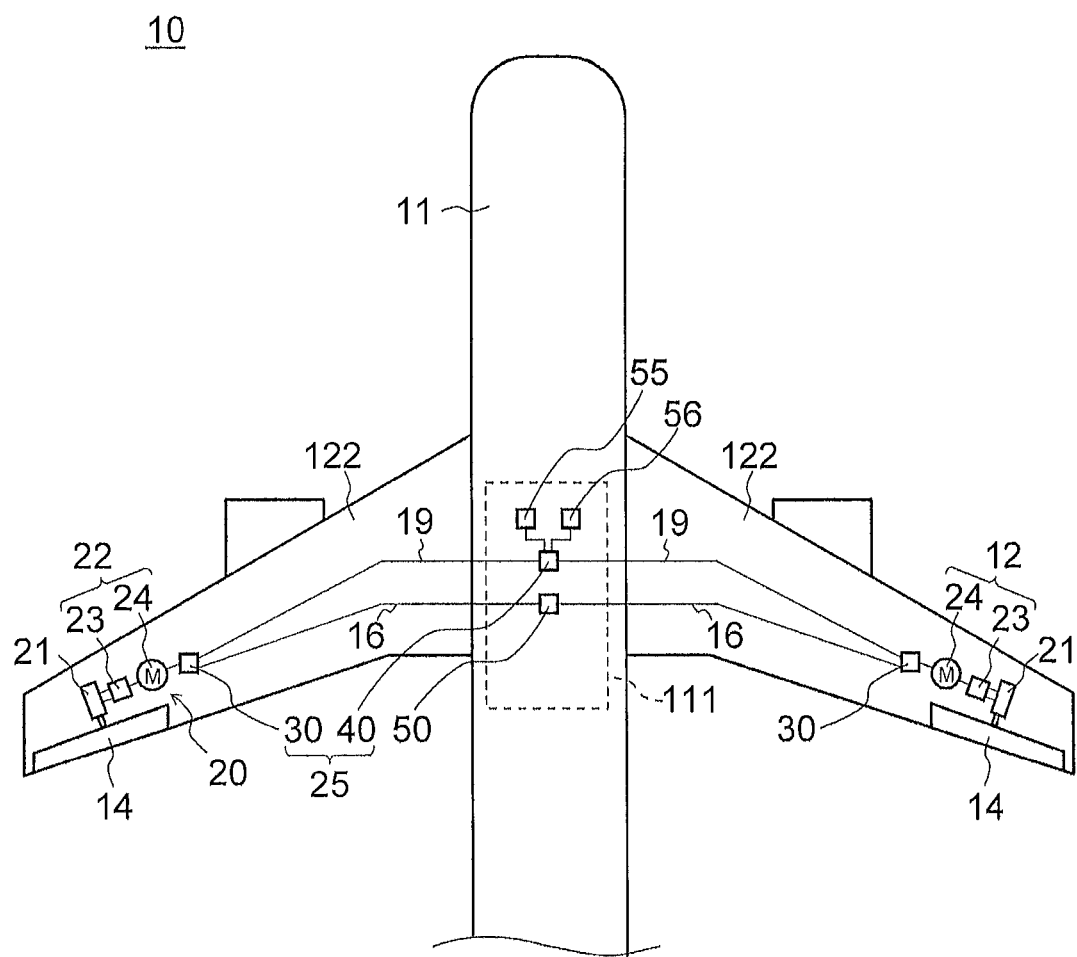
FIG. 14 is a schematic view showing a part of an aircraft provided with an electric actuator driving and controlling device according to a fourth modification example.

As shown in FIG. 13, it may also be possible that the electric actuator driving and controlling device 25 is provided with a plurality of drive units 30, and the lower-order-side communication portion 44 of one control unit 40 transmits a power command signal to each of the plurality of drive units 30. That is, it may also be possible that the one control unit 40 is shared between the plurality of drive units 30. Compared with a case where one control unit 40 is provided with respect to one drive unit 30, this can achieve size and weight reduction of the electric actuator driving and controlling device 25 as a whole. This can also reduce the number of components required. Furthermore, the number of control units 40 to be cooled inside the fuselage 11 may be decreased, and thus heat radiation designing may be facilitated.

Third Modification Example

The foregoing embodiment has shown an example in which, based on a speed command signal from the upper-order control device 56, the control unit 40 of the electric actuator driving and controlling device 25 may generate a power command signal and transmit the power command signal to the drive unit 30. There is, however, no limitation thereto, and it may also be possible that the control unit 40 receives, from the upper-order control device 56, a command signal related to a target operation state of the actuation mechanism 21, such as, for example, a positional command signal related to a target position of the actuation mechanism 21 and generates, based thereon, a power command signal. In other words, it may also be possible that a function of calculating, based on a positional command signal, a target speed of the rotary motor 24 is imparted to the control unit 40.

In the conventional aircraft 10, generally, it is the upper-order control device 56 that has the function of calculating, based on a positional command signal, a target speed of the rotary motor 24. This is because a responsibility of calculating, based on a positional command signal, a target speed of the rotary motor 24 is important and thus should be assumed by a device disposed in a stable environment in the fuselage 11.

Herein, in the embodiment of the present invention, the control unit 40 of the electric actuator driving and controlling device 25 may be disposed inside the fuselage 11. Thus, compared with a case where the control unit 40 is disposed inside the wing portion 12, reliability of the control unit 40 can be increased. Accordingly, it becomes possible for the control unit 40 to assume the responsibility of calculating, based on a positional command signal, a target speed of the rotary motor 24.

Fourth Modification Example

The foregoing embodiment has shown an example in which the electric actuator driving and controlling device 25 may drive and control the rotary motor 24 for driving the elevator 13. There is, however, no particular limitation on use of the rotary motor 24 as long as the control unit 40 is disposed in the second space inside the fuselage 11 and the drive unit 30 is disposed in the first space limited compared with the second space.

For example, a case is considered where the rotary motor 24 directly or indirectly drives the actuation mechanism 21 configured to drive a moving surface of the aircraft 10. In this case, the moving surface of the aircraft 10 can be, besides the elevator 13, a primary fight control surface configured as a control surface such as an aileron or a rudder, or a secondary flight control surface configured as a flap, a spoiler, or the like. In a case where the moving surface is an aileron, a flap, or a spoiler, the drive unit 30 may be disposed in a space inside a primary wing. In a case where the moving surface is a rudder, the drive unit 30 may be disposed in a space inside the vertical tail plane.

FIG. 13 is a schematic view showing the entire aircraft 10 in a case where the electric actuator driving and controlling device 25 drives and controls the rotary motor 24 configured to drive the actuation mechanism 21 configured to drive an aileron 14 provided in each of primary wings 122. In this case, the drive unit 30 of the electric actuator driving and controlling device 25 may be disposed in a first space inside each of the primary wings 122. On the other hand, the control unit 40, the driving power source device 50, and the controlling power source device 55 may be disposed in a second space inside the fuselage 11, such as, for example, the electrical bay 111. The control unit 40 may be communicable with the drive unit 30 disposed inside each of the primary wings 122 via the communication line 19.

Fifth Modification Example

It is also possible to apply the technical ideas described in the foregoing embodiment and the modification examples to the electric actuator driving and controlling device 25 configured to drive and control an electric actuator mounted in a piece of equipment other than the aircraft 10. Furthermore, while the foregoing embodiment and the modification examples have shown an example in which the electric actuator may be the rotary motor 24, there is no limitation thereto. For example, it may also be possible that the electric actuator is an electric motor of a type other than the rotary motor 24, such as a linear motor. Furthermore, it may also be possible that the electric actuator is a solenoid.

The following describes an example of an arrangement of the electric actuator driving and controlling device 25 with respect to each different type of a piece of equipment in which the electric actuator driving and controlling device 25 is mounted.

In a case where the piece of equipment is an automobile, a first space in which the drive unit 30 of the electric actuator driving and controlling device 25 is disposed may be a space, for example, in a wheel or a brake device of the automobile. Furthermore, a second space in which the control unit 40 of the electric actuator driving and controlling device 25 is disposed may be a space, for example, inside a vehicle of the automobile.

Compared with a space inside the vehicle, a space in the wheel or the brake device may be limited in terms of a capacity and dimensions. Furthermore, compared with a space inside the vehicle, a space in the wheel or the brake device may be harsh in terms also of an environment. For example, a device disposed in a space in the wheel or the brake device may undergo vibrations of a magnitude larger than that of vibrations undergone by a device disposed in a space inside the vehicle.

According to this modification example, the electric actuator driving and controlling device 25 may be structurally divided into the drive unit 30 and the control unit 40, and thus the number of components constituting the drive unit 30 can be suppressed to a requisite minimum. This can facilitate layout designing of a space in the wheel or the brake device, in which the drive unit 30 is disposed. Furthermore, the control unit 40 may be disposed in a space inside the vehicle, and thus a magnitude of vibrations undergone by the control unit 40 can be reduced, so that reliability of the control unit 40 can be increased.

In a case where the piece of equipment is a ship, a first space in which the drive unit 30 of the electric actuator driving and controlling device 25 is disposed may be a space, for example, in a vicinity of an intake/exhaust port of an engine of the ship. Furthermore, a second space in which the control unit 40 of the electric actuator driving and controlling device 25 is disposed may be a space, for example, in a vicinity of the engine of the ship or in an engine control room of the ship.

Compared with a space in the vicinity of the engine or in the engine control room, a space in the vicinity of the intake/exhaust port of the engine may be limited in terms of a capacity and dimensions. Furthermore, compared with a space in the vicinity of the engine or in the engine control room, a space in the vicinity of the intake/exhaust port of the engine may be harsh in terms also of an environment. For example, a temperature in a space in the vicinity of the intake/exhaust port of the engine may be higher than a temperature in a space in the vicinity of the engine or in the engine control room.

According to this modification example, the electric actuator driving and controlling device 25 may be structurally divided into the drive unit 30 and the control unit 40, and thus the number of components constituting the drive unit 30 can be suppressed to a requisite minimum. This can facilitate layout designing of a space in the vicinity of the intake/exhaust port of the engine, in which the drive unit 30 is disposed. Furthermore, the control unit 40 may be disposed in a space in the vicinity of the engine or in the engine control room, and thus a thermal environment around the control unit 40 can be improved, so that reliability of the control unit 40 can be increased.

In a case where the piece of equipment is a railway vehicle, a first space in which the drive unit 30 of the electric actuator driving and controlling device 25 is disposed may be a space, for example, in a brake device of the railway vehicle. Furthermore, a second space in which the control unit 40 of the electric actuator driving and controlling device 25 is disposed may be a space, for example, in a device box provided under a floor of the railway vehicle.

Compared with a space in the device box provided under the floor, a space in the brake device may be limited in terms of a capacity and dimensions. Furthermore, compared with a space in the device box provided under the floor, a space in the brake device may be harsh in terms also of an environment. For example, a device disposed in a space in the brake device may undergo vibrations of a magnitude larger than that of vibrations undergone by a device disposed in a space in the device box provided under the floor.

According to this modification example, the electric actuator driving and controlling device 25 may be structurally divided into the drive unit 30 and the control unit 40, and thus the number of components constituting the drive unit 30 can be suppressed to a requisite minimum. This can facilitate layout designing of a space in the brake device, in which the drive unit 30 is disposed. Furthermore, the control unit 40 may be disposed in a space in the device box provided under the floor, and thus a magnitude of vibrations undergone by the control unit 40 can be reduced, so that reliability of the control unit 40 can be increased.

While several modification examples with respect to the foregoing embodiment have been described thus far, needless to say, plural ones of the modification examples can be combined as appropriate, and such combinations are also applicable to the present invention.

What is claimed is:

1. An electric actuator device configured to drive and control an electric actuator mounted in a piece of equipment, comprising:

a drive unit positioned in a first space in the piece of equipment and configured to apply power to the electric actuator; and a control unit positioned in a second space in the piece of equipment and configured to transmit, to the drive unit, a power command signal including information related to the power to be applied to the electric actuator, wherein the first space having the drive unit positioned therein is limited in space compared with the second space having the control unit positioned therein, wherein the drive unit comprises:

an interface portion configured to receive the power command signal and, based on the received power command signal, output either a voltage or a current; and a drive element portion configured to, based on either the voltage or the current inputted from the interface portion, apply the power to the electric actuator, wherein the control unit, positioned in the second space, is configured to transmit the power command signal to the drive unit by a serial communication or an optical communication, wherein the interface portion, positioned in the first space, is configured to generate a pulse width modulation (PWM) signal based on the power command signal transmitted by either the serial communication or the optical communication from the control unit and input the PWM signal to the drive element portion, wherein the electric actuator is a three-phase, brushless DC motor, wherein the drive element portion of the drive unit comprises a three-phase inverter circuit including six switching elements that are configured to apply the power to the electric actuator, and wherein the interface portion is configured to input either the voltage or the current to each of the six switching elements of the drive element portion of the drive unit.

2. The electric actuator device according to claim 1, wherein the control unit is configured to transmit the power command signal to the drive unit by the serial communication, and wherein a period of the serial communication between the control unit and the drive unit is different from a period of the PWM signal inputted to the drive element portion by the interface portion.

3. The electric actuator device according to claim 1, wherein the control unit is configured to transmit the power command signal to the drive unit by the optical communication, and
wherein the control unit is configured to transmit, as the power command signal, the PWM signal to the drive unit by the optical communication.

4. The electric actuator device according to claim 1, wherein the drive unit comprises a driving power source portion including a power source shutoff switch and connected to the drive element portion, and
wherein the interface portion, upon detecting a communication error between itself and the control unit, is configured to control the power source shutoff switch to shut off power supply from the driving power source portion to the drive element portion.

5. The electric actuator device according to claim 1, wherein the control unit, upon detecting a communication error between itself and the drive unit, is configured to shut off a power source connected to the drive unit.

6. The electric actuator device according to claim 1, wherein the drive unit further comprises a monitor portion configured to obtain monitor information including at least information related to a current value of the electric actuator, and
wherein the interface portion is configured to transmit the monitor information to the control unit.

7. The electric actuator device according to claim 1, wherein the drive unit comprises a plurality of drive units, and
wherein the control unit includes a communication portion configured to transmit the power command signal to each of the plurality of the drive units.

8. The electric actuator device according to claim 1, wherein the control unit is configured to receive a speed command signal related to a target speed of the electric actuator, generate the power command signal based thereon, and transmit the power command signal to the drive unit.

9. The electric actuator device according to claim 1, wherein the control unit is configured to receive a command signal related to a target operation state of the piece of equipment, generate the power command signal based thereon, and transmit the power command signal to the drive unit.

10. The electric actuator device according to claim 1, wherein a height of the first space in which at least the interface portion of the drive unit is positioned is lower than a height of the second space in which at least the control unit is positioned.

11. The electric actuator device according to claim 1, wherein the first space in which at least the interface portion of the drive unit is positioned is in a wing portion of an aircraft, and
wherein the second space in which at least the control unit is positioned is in a fuselage of the aircraft.

12. An aircraft, comprising:
a moving surface;
an actuation mechanism configured to drive the moving surface;
an electric motor configured to either directly or indirectly drive the actuation mechanism;
a drive unit positioned inside a wing portion of the aircraft and configured to apply power to the electric motor; and
a control unit positioned in a fuselage of the aircraft and configured to transmit, to the drive unit, a power command signal including information related to the power to be applied to the electric motor,
wherein the drive unit comprises:
an interface portion configured to receive the power command signal and, based on the received power command signal, output either a voltage or a current,
a drive element portion configured to, based on either the voltage or the current inputted from the interface portion, apply the power to the electric motor,
wherein the control unit, positioned in the fuselage of the aircraft, is configured to transmit the power command signal to the drive unit by either a serial communication or an optical communication,
wherein the interface portion, positioned inside the wing portion of the aircraft, is configured to generate a pulse width modulation (PWM) signal based on the power command signal transmitted by either the serial communication or the optical communication from the control unit and input the PWM signal to the drive element portion,
wherein the electric motor is a three-phase, brushless DC motor,
wherein the drive element portion of the drive unit comprises a three-phase inverter circuit including six switching elements that are configured to apply the power to the electric motor, and
wherein the interface portion is configured to input either the voltage or the current to each of the six switching elements of the drive element portion of the drive unit.

13. An electric actuator controller, comprising:
a driver positioned in a first space in a piece of equipment and configured to apply power to an electric actuator in the piece of equipment; and
a controller positioned in a second space in the piece of equipment and configured to transmit, to the driver, a power command signal including information related to the power to be applied to the electric actuator,
wherein the first space has a space limitation in accommodating the controller relative to the second space,
wherein the driver comprises:
an interface portion configured to receive the power command signal and, based on the received power command signal, output either a voltage or a current; and
a drive element portion configured to, based on either the voltage or the current inputted from the interface portion, apply the power to the electric actuator,
wherein the controller is configured to transmit the power command signal to the driver by either a serial communication or an optical communication,
wherein the interface portion is configured to generate a pulse width modulation (PWM) signal based on the power command signal transmitted by either the serial communication or the optical communication from the controller and input the PWM signal to the drive element portion,
wherein the electric actuator is a three-phase, brushless DC motor,
wherein the drive element portion of the driver comprises a three-phase inverter circuit including six switching elements that are configured to apply the power to the electric actuator, and
wherein the interface portion is configured to input either the voltage or the current to each of the six switching elements of the drive element portion of the drive unit.

14. The electric actuator device according to claim 1, wherein the control unit is positioned in the second space in the piece of equipment so as to structurally separate the control unit from the drive unit, including the interface portion, that is positioned in the first space in the piece of equipment.

15. The electric actuator device according to claim 1, wherein the first space is separate and different from the second space.

* * * * *